United States Patent
Sukhomlinov et al.

(10) Patent No.: US 12,314,782 B2
(45) Date of Patent: *May 27, 2025

(54) MICROSERVICES ARCHITECTURE

(71) Applicant: Intel Corporation, Santa Clara, CA (US)

(72) Inventors: Vadim Sukhomlinov, Santa Clara, CA (US); Kshitij A. Doshi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,803

(22) Filed: Mar. 27, 2023

(65) Prior Publication Data

US 2023/0251915 A1 Aug. 10, 2023

Related U.S. Application Data

(63) Continuation of application No. 17/867,506, filed on Jul. 18, 2022, now Pat. No. 11,645,127, which is a continuation of application No. 17/111,581, filed on Dec. 4, 2020, now Pat. No. 11,467,888, which is a continuation of application No. 15/636,119, filed on Jun. 28, 2017, now Pat. No. 10,860,390.

(51) Int. Cl.
*G06F 3/00* (2006.01)
*G06F 9/50* (2006.01)
*G06F 9/54* (2006.01)

(52) U.S. Cl.
CPC ............ *G06F 9/541* (2013.01); *G06F 9/5038* (2013.01); *G06F 9/5072* (2013.01)

(58) Field of Classification Search
CPC ............................................. G06F 9/54
USPC ............................................... 719/328
See application file for complete search history.

(56) References Cited

U.S. PATENT DOCUMENTS

| | | | |
|---|---|---|---|
| 9,024,957 B1 | 5/2015 | Mahan et al. | |
| 9,804,886 B1 * | 10/2017 | Wells | G06F 9/5033 |
| 9,823,950 B1 * | 11/2017 | Carrier | G06F 9/543 |

(Continued)

FOREIGN PATENT DOCUMENTS

| | | |
|---|---|---|
| CN | 1942860 | 4/2007 |
| CN | 101836200 | 9/2010 |

(Continued)

OTHER PUBLICATIONS

Sajee Mathew, Overview of Amazon Web Services . (Year: 2014).*

(Continued)

*Primary Examiner* — Lechi Truong
(74) *Attorney, Agent, or Firm* — Essential Patents Group, LLP; Christopher K. Gagne

(57) ABSTRACT

A computing apparatus, including: a hardware computing platform; and logic to operate on the hardware computing platform, configured to: receive a microservice instance registration for a microservice accelerator, wherein the registration includes a microservice that the microservice accelerator is configured to provide, and a microservice connection capability indicating an ability of the microservice instance to communicate directly with other instances of the same or a different microservice; and log the registration in a microservice registration database.

21 Claims, 11 Drawing Sheets

(56) References Cited

U.S. PATENT DOCUMENTS

| | | | |
|---|---|---|---|
| 9,858,105 B1* | 1/2018 | Upadhyay | G06F 9/45558 |
| 9,973,525 B1 | 5/2018 | Roturier et al. | |
| 10,057,185 B1* | 8/2018 | Burgin | H04L 47/781 |
| 10,489,402 B2 | 11/2019 | Li et al. | |
| 10,798,157 B2 | 10/2020 | Bernat et al. | |
| 10,810,106 B1 | 10/2020 | Amit et al. | |
| 2002/0069279 A1 | 6/2002 | Romero et al. | |
| 2003/0108331 A1 | 6/2003 | Plourde, Jr. et al. | |
| 2003/0233221 A1* | 12/2003 | O'Brien | G06F 11/3664 |
| | | | 703/23 |
| 2004/0122926 A1 | 6/2004 | Moore et al. | |
| 2004/0215677 A1 | 10/2004 | Beaumont | |
| 2006/0179037 A1 | 8/2006 | Turner et al. | |
| 2007/0078991 A1* | 4/2007 | Kim | G06Q 10/10 |
| | | | 709/228 |
| 2008/0060082 A1 | 3/2008 | Matthews et al. | |
| 2008/0109452 A1 | 5/2008 | Patterson | |
| 2008/0259794 A1 | 10/2008 | Zou et al. | |
| 2008/0276217 A1 | 11/2008 | Nagaoka | |
| 2010/0125477 A1* | 5/2010 | Mousseau | G06F 9/50 |
| | | | 706/50 |
| 2011/0213712 A1 | 9/2011 | Hadar et al. | |
| 2011/0276490 A1 | 11/2011 | Wang et al. | |
| 2013/0066939 A1 | 3/2013 | Shao | |
| 2013/0304900 A1 | 11/2013 | Trabelsi et al. | |
| 2013/0339250 A1 | 12/2013 | Katzin et al. | |
| 2014/0025762 A1 | 1/2014 | Singh et al. | |
| 2014/0089453 A1* | 3/2014 | Pandey | H04L 67/1097 |
| | | | 709/213 |
| 2014/0189845 A1 | 7/2014 | Cai et al. | |
| 2014/0223536 A1* | 8/2014 | Matsushima | H04L 63/0227 |
| | | | 709/217 |
| 2014/0244311 A1 | 8/2014 | Dawson et al. | |
| 2015/0019480 A1* | 1/2015 | Maquaire | G06F 16/2365 |
| | | | 707/609 |
| 2015/0067171 A1 | 3/2015 | Yum et al. | |
| 2015/0350021 A1* | 12/2015 | Morris | H04L 67/10 |
| | | | 709/224 |
| 2016/0112475 A1 | 4/2016 | Lawson et al. | |
| 2016/0112521 A1 | 4/2016 | Lawson et al. | |
| 2016/0205037 A1 | 7/2016 | Gupte et al. | |
| 2016/0212114 A1* | 7/2016 | Kuroyanagi | H04L 63/08 |
| 2016/0308983 A1* | 10/2016 | Jin | H04L 67/306 |
| 2016/0314219 A1* | 10/2016 | Yu | H04L 67/01 |
| 2016/0364271 A1 | 12/2016 | Burger et al. | |
| 2016/0379686 A1 | 12/2016 | Burger et al. | |
| 2017/0017532 A1* | 1/2017 | Falco | G06F 9/546 |
| 2017/0034258 A1* | 2/2017 | Deulgaonkar | H04L 67/1001 |
| 2017/0160880 A1 | 6/2017 | Jose et al. | |
| 2017/0192811 A1 | 7/2017 | Kiess et al. | |
| 2017/0223117 A1 | 8/2017 | Messerli et al. | |
| 2017/0262922 A1 | 9/2017 | Namboodiri et al. | |
| 2017/0264613 A1 | 9/2017 | Phillips et al. | |
| 2018/0005186 A1 | 1/2018 | Hunn | |
| 2018/0034924 A1 | 2/2018 | Horwood | |
| 2018/0121026 A1* | 5/2018 | Nadig | G06F 40/205 |
| 2018/0213037 A1 | 7/2018 | Roman et al. | |
| 2018/0219949 A1* | 8/2018 | Lee | H04L 67/34 |
| 2018/0227388 A1 | 8/2018 | Kuo et al. | |
| 2018/0284975 A1* | 10/2018 | Carrier | G06F 16/9535 |
| 2018/0331905 A1 | 11/2018 | Toledo et al. | |
| 2018/0375712 A1 | 12/2018 | Krohling et al. | |
| 2019/0028552 A1 | 1/2019 | Johnson, III et al. | |
| 2019/0129742 A1 | 5/2019 | Hasegawa et al. | |
| 2019/0138729 A1 | 5/2019 | Blundell | |
| 2019/0147524 A1* | 5/2019 | Arsid | G06Q 20/12 |
| | | | 705/26.5 |
| 2019/0188049 A1 | 6/2019 | Choudhary et al. | |
| 2019/0245859 A1 | 8/2019 | Berezin et al. | |
| 2019/0281123 A1 | 9/2019 | Luo et al. | |
| 2019/0317802 A1* | 10/2019 | Bachmutsky | G06F 9/5044 |
| 2019/0349447 A1 | 11/2019 | Adams et al. | |
| 2019/0384927 A1* | 12/2019 | Bhatnagar | G06F 21/602 |
| 2020/0012569 A1 | 1/2020 | Natanzon et al. | |
| 2020/0057676 A1 | 2/2020 | Vaikar | |
| 2020/0134030 A1 | 4/2020 | Natanzon et al. | |
| 2020/0159597 A1* | 5/2020 | Gino | G06F 9/5038 |
| 2020/0174840 A1 | 6/2020 | Zhao et al. | |
| 2020/0313970 A1* | 10/2020 | Almasmoum | H04L 41/0896 |
| 2021/0195506 A1 | 6/2021 | Bartolome et al. | |
| 2022/0350679 A1* | 11/2022 | Sukhomlinov | G06F 9/541 |
| 2024/0114076 A1 | 4/2024 | Horwood | |

FOREIGN PATENT DOCUMENTS

| | | |
|---|---|---|
| CN | 105164990 | 12/2015 |
| CN | 105577780 | 5/2016 |
| CN | 106250199 A | 12/2016 |
| CN | 106464592 | 2/2017 |
| CN | 106464736 | 2/2017 |
| CN | 106464742 | 2/2017 |
| CN | 106603582 | 4/2017 |
| CN | 106610836 | 5/2017 |
| CN | 107409116 | 11/2017 |
| CN | 107637018 | 1/2018 |
| WO | 2016192866 | 12/2016 |

OTHER PUBLICATIONS

Mark D Wilkinson, The Semantic Automated Discovery and Integration (SADI) Web service Design-Pattern, API and Reference Implementation. (Year: 2011).*

Anca Iordache, High Performance in the Cloud with FPGA Groups. (Year: 2016).*

Ning Li, OmniVoke: A Framework for Automating the Invocation of Web APIs. (Year: 2011).*

Wenyu Zhou, VMCTune: A Load Balancing Scheme for Virtual Machine Cluster Based on Dynamic Resource Allocation. (Year: 2010).*

Notice of Allowance for U.S. Appl. No. 15/636,119, dated Aug. 6, 2020.

Notice of Allowance for U.S. Appl. No. 17/111,581, dated May 23, 2022.

Notice of Allowance for U.S. Appl. No. 17/867,506, dated Jan. 5, 2023.

Office Action for U.S. Appl. No. 17/111,581, dated Sep. 23, 2021.

Alshuqayran, N., "A Systematic Mapping Study in Microservice Architecture" , 2016.

Carapinha, J., "Orchestrator Interfaces" , (Year: 2015).

Labonte, F., et al. , "The Stream Virtual Machine" , Proceedings of the 13th International Conference on Parallel Architecture and Compilation Techniques (PACT04), 2004.

Malinverno, Paolo, "Magic Quadrant for Full Life Cycle API Management" , (Year: 2019).

Final Office Action from U.S. Appl. No. 16/989,210 notified Aug. 16, 2023, 8 pgs.

Final Office Action from U.S. Appl. No. 16/989,210 notified Nov. 9, 2022, 43 pgs.

Final Office Action from U.S. Appl. No. 16/989,210 notified Jan. 20, 2022, 34 pgs.

Non-Final Office Action from U.S. Appl. No. 16/234,734 notified Mar. 31, 2020, 12 pgs.

Non-Final Office Action from U.S. Appl. No. 16/989,210 notified Apr. 5, 2023, 38 pgs.

Non-Final Office Action from U.S. Appl. No. 16/989,210 notified Jun. 8, 2022, 36 pgs.

Non-Final Office Action from U.S. Appl. No. 16/989,210 notified Sep. 14, 2021, 32 pgs.

Notice of Allowance for U.S. Appl. No. 15/942,012, dated Mar. 11, 2022.

Notice of Allowance from U.S. Appl. No. 16/234,734 notified May 28, 2020, 6 pgs.

Office Action for U.S. Appl. No. 15/942,012, dated Jul. 22, 2021.

Office Action from Chinese Patent Application No. 202210792736.1 notified Aug. 29, 2023, 6 pgs.

Notice of Allowance from Chinese Patent Application No. 201810687136.2 notified Aug. 6, 2024, 7 pgs.

(56) References Cited

OTHER PUBLICATIONS

Office Action from Chinese Patent Application No. 201810687136.2 notified May 28, 2024, 24 pgs.
Non-Final Office Action from U.S. Appl. No. 18/234,791 notified Jun. 17, 2024, 35 pgs.
Notice of Allowance from Chinese Patent Application No. 202210792736.1 notified Jan. 25, 2024, 3 pgs.
Office Action from Chinese Patent Application No. 201810687136.2 notified Jan. 16, 2024, 39 pgs.
Final Office Action from U.S. Appl. No. 18/234,791 notified Oct. 21, 2024, 41 pgs.

* cited by examiner

MICROSERVICES ARCHITECTURE

CROSS-REFERENCE TO RELATED APPLICATIONS

This Application is a continuation of prior co-pending U.S. patent application Ser. No. 17/867,506, filed Jul. 18, 2022, entitled "Microservices Architecture", now issued as U.S. Pat. No. 11,645,127, which is a continuation of prior U.S. patent application Ser. No. 17/111,581, filed Dec. 4, 2020, entitled "Microservices Architecture", now U.S. Pat. No. 11,467,888, which is a continuation of prior U.S. patent application Ser. No. 15/636,119, filed Jun. 28, 2017, entitled "Microservices Architecture", now U.S. Pat. No. 10,860,390. Each of these prior Patent Applications is hereby incorporated herein by reference in its entirety.

FIELD OF THE SPECIFICATION

This disclosure relates in general to the field of cloud computing, and more particularly, though not exclusively, to a system and method for a microservices architecture.

BACKGROUND

Contemporary computing practice has moved away from hardware-specific computing and toward "the network is the device." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
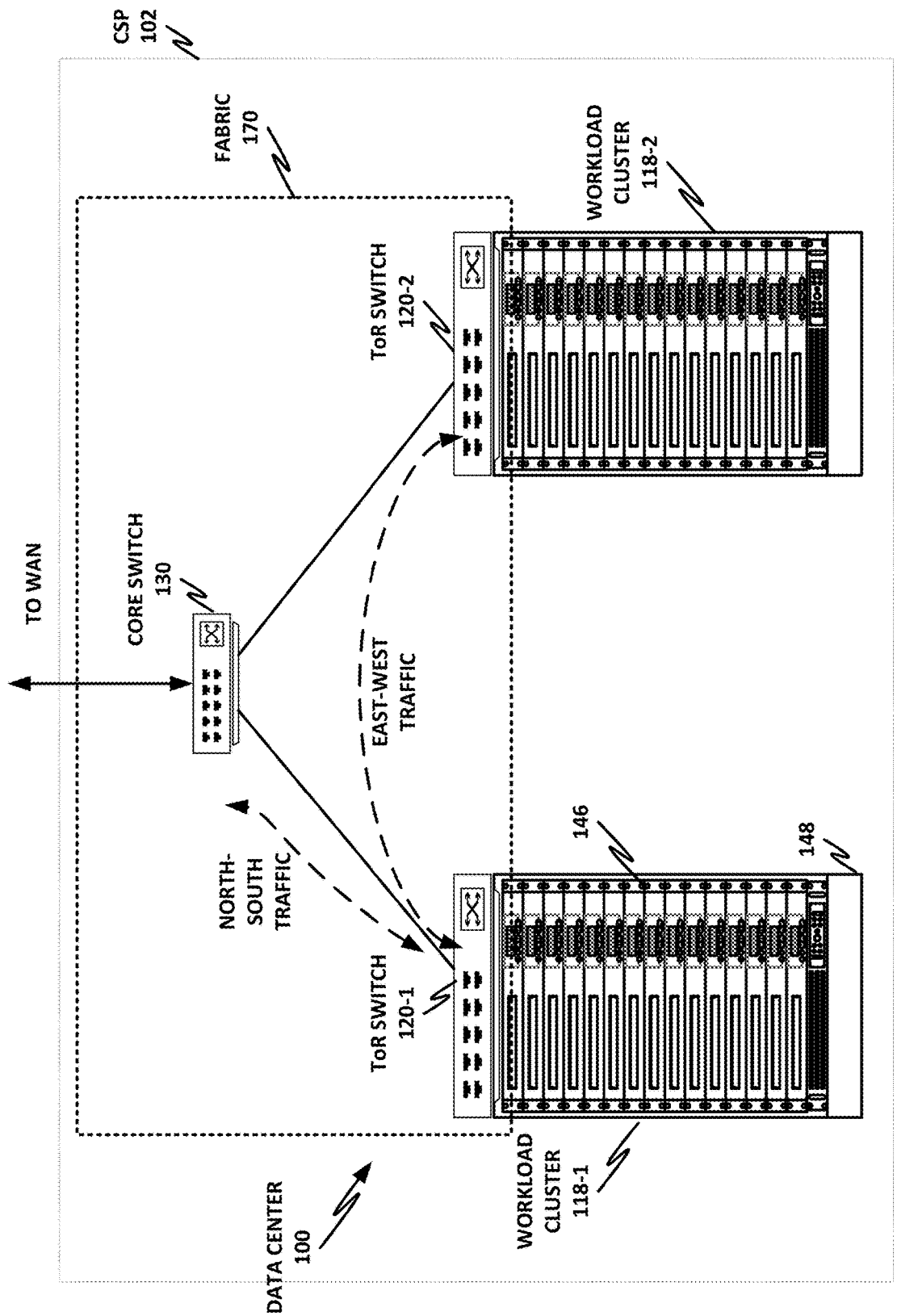
FIG. 1 is a network-level diagram of a cloud service provider (CSP), according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In a contemporary data center, functions previously performed by a dedicated logic element may now more usefully be thought of in terms of a logical function. To provide just one illustrative example, in a network function virtualization (NFV) context, one hop in the service chain may provide deep packet inspection (DPI). Other microservices may include encryption, decryption, compression, decompression, IP security (IPsec), accounting functions, and performance trackers by way of nonlimiting example.

In a legacy network environment, the example DPI function may have been performed by a dedicated DPI hardware appliance whose hardware ingress ports were connected to a previous hop in the service chain, and whose hardware egress ports were connected to the next hop in the service chain.

Such hardcoded network functions have, in many cases, been supplanted by data centers in which a function like DPI may be provided in several different ways. For example, the DPI function could be performed on software operating in a virtual machine (VM) forming a virtual service appliance, instances of which can be spawned on demand. However, in some deployments, even the provisioning of virtual machines on demand may not be sufficient. As data centers become very large and the volume of traffic increases, latency and bandwidth become increasingly important, and data center operators may want to avoid service functions becoming a performance bottleneck. Thus, in many data centers additional flexibility and speed may be provided by further specializing certain functions.

For example, rather than provision VM DPI appliances on demand, a data center may provide a resource pool with a number of instances of a specialized resource that have been highly optimized. The advantage of a resource pool is that highly optimized resources can be shared among many different nodes. Resource pools may include elements such as compute nodes, memory (volatile or non-volatile), storage, application-specific integrated circuits (ASICs), systems on a chip (SoCs), or field programmable gate arrays (FPGAs), by way of nonlimiting example. Such resources can be allocated to a compute node (which may be considered a "composite node") on demand to meet data center needs. Thus, a resource pool could include a number of pre-provisioned appliances optimized for a particular task, or a variety of highly-capable resources that can be aggregated into such a node. Such resource pools may be useful for hosting many different kinds of accelerators in a data center.

One example of a resource pool may be an FPGA pool. This may be a pool of FPGAs that can be configured and programmed on demand to provide a particular function at hardware or near-hardware speeds. Thus, an FPGA pool can advantageously provide flexibility similar to the flexibility available with software resources, but with speeds similar to hardware only resources. Thus, returning to the example of a DPI appliance, an FPGA from an FPGA pool may be allocated to the DPI function, and configured to provide DPI at very high speeds.

In cases where even greater speed is needed, true hardware resources may also be provided. These may be, for example, ASICS programmed to provide a particular function at speeds much higher than those that can be realized in software.

A system programmer providing DPI may know at design time which resources are available, and program software appropriately. For example, if the system designer knows that an FPGA pool is available in the data center, he may program his software to discover available FPGA instances (via an orchestrator, for example), and request that one or more instances of an FPGA be programmed with the DPI function, and then hand off actual DPI processing to the provisioned FPGA. But the flexible nature of a data center makes it possible to further improve on this system even in cases where the designer may not know at design time which resources will ultimately be available in the data center.

Consider for example, a case where the system programmer knows at design time that his software is to provide a DPI function, and that it is preferable to provide DPI at the highest speed possible in any given circumstance, but is not aware of (and need not be aware of) the specific resource that will carry out the DPI function.

It is possible for a data center to have different systems resources available, such as GPU arrays, multicore CPUs, hardware accelerators, FPGAs, virtual appliances, and many others. Any of these may perform, or may play a part in performing a desired function, and it is advantageous for system software to be able to use a "best available" resource, rather than being tied to one particular resource.

In some cases, hardware and platform specialization may be detected and leveraged at low levels in the software stack. However, this may come at a cost of portability and maintenance of drivers in underlying hardware. As an application is required to handle the presence or absence of accelerators or other resources on its own, the system programmer may become bogged down in the details of how a task is realized (e.g., what resources will carry out the task) rather than focusing on the task itself.

The present specification provides a system and method to alleviate this issue by providing so-called "microservices." Microservices refers to a framework for partitioning functionality in a highly configurable and scalable way that can seamlessly encapsulate a desired function in a wrapper, without the system designer needing to be aware at design time how or on what resources the function will be carried out.

The system and method disclosed herein also addresses the scalability of hardware and software implementations for instances of micro services. There is described herein a framework for implementing discovery of a microservice and its capabilities. Portability and maintainability are enhanced because the framework can be adapted to capabilities that become available in the future, including across different vendors. The framework can also substantially reduce latency by providing highly optimized service chaining.

By way of example, the system disclosed herein optimizes operation flows across distributed systems built of diverse, low-level components that are accessed via "wrapper" functions rather than addressed individually. The usability of the microservices is further enhanced by automating and streamlining flows of active messages as chains of low latency microservice invocations. This can obviate the need for a request/response interaction that introduces substantial overhead in many instances.

By way of example, a microservices application programming interface (API) is exposed to the host software. The designer of the host software need not understand or be concerned about the implementation details of the services behind the microservices API. Rather, the microservices API provides standardized calls to various capabilities, including types and formats of inputs and outputs. The microservices API then provides the function call to a microservices driver, which can (possibly in conjunction with an orchestrator) discover and/or allocate instances of the various microservices in different forms, such as hardware accelerators, FPGAs, resource pools, CPUs, GPUs, or local software.

As instances of a microservice or a microservice-capable resource come online, they may register with a service discovery function (SDF). The SDF can then maintain a catalog of available microservices, which may include mappings for translating the standard microservices API calls to an API call usable by a particular instance of the microservice. This architecture enables the specialization of certain architecture capabilities, such as "bump in the wire" acceleration, FPGA function sets invoked from processing cores, or purpose optimized processors with highly specialized software. These can be transparently integrated into the data center as needed.

When the microservices driver receives a request for a new microservice, it can query the SDF, and identify the availability of microservice instances. Note that this may include not only the availability of currently running microservice instances, but also the availability of resources that can be provisioned to provide the microservices. For example, an FPGA may be available but may not yet be programmed to provide a microservice. The SDF catalog may include configuration information such as a gate configuration for programming an FPGA to provide the desired microservice. The microservices driver can then query the SDF to determine that an FPGA is available to carry out the microservice function, and may receive from the catalog the appropriate mapping for the function as well as the gate configuration for the FPGA. The microservices driver may then program the FPGA with the gate configuration, and once the FPGA is programmed, the microservice driver may begin forwarding calls to the FPGA via the standardized microservices API mapped to the specific interface for that FPGA instance.

Similar procedures can be used for provisioning, for example, virtual machine or virtual appliance instances, software to run on a CPU or GPU, or allocating a hardware accelerator or ASIC instance to the microservice so that it can be used for that microservice.

This framework can provide advantages over other solutions, such as the use of middleware to abstract away details of an instance call. Such middleware may add latency or overhead, as well as negate the portability of the solution, while in some cases also inhibiting full expression of the hardware capabilities. In contrast, according to the microservices architecture of the present specification, microservices are discovered and provisioned dynamically into streams with the opportunity to fully utilize the hardware and/or software capabilities of the microservice instance. The microservices driver handles translation of generic function calls at the microservices API level into specific and optimized service calls to the microservice instances.

Thus, the task logic from various implementations of a function are insulated from implementation details. This enables tasks to be agnostic of where and how the function is actually carried out. As described below, this can also automate the flow of processing service chains, as a plurality of microservice instances of different types can be provisioned and chained together into a service chain, without the need for each microservice instance to communicate results back upstream to a VM or server. In some cases, this can eliminate much of the traffic flow required in request-response frameworks. Thus, provisioning of microservices is adaptable and is highly optimized, and new microservices and microservice instances can be proliferated as accelerator functions across the data center.

A system and method for microservices architecture will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of a traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include a fabric interface, such as an Intel® Host Fabric Interface (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® OmniPath™, TrueScale™, Ultra Path Interconnect (UPI) (formerly called QPI or KTI), STL, FibreChannel, Ethernet, FibreChannel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as OmniPath™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
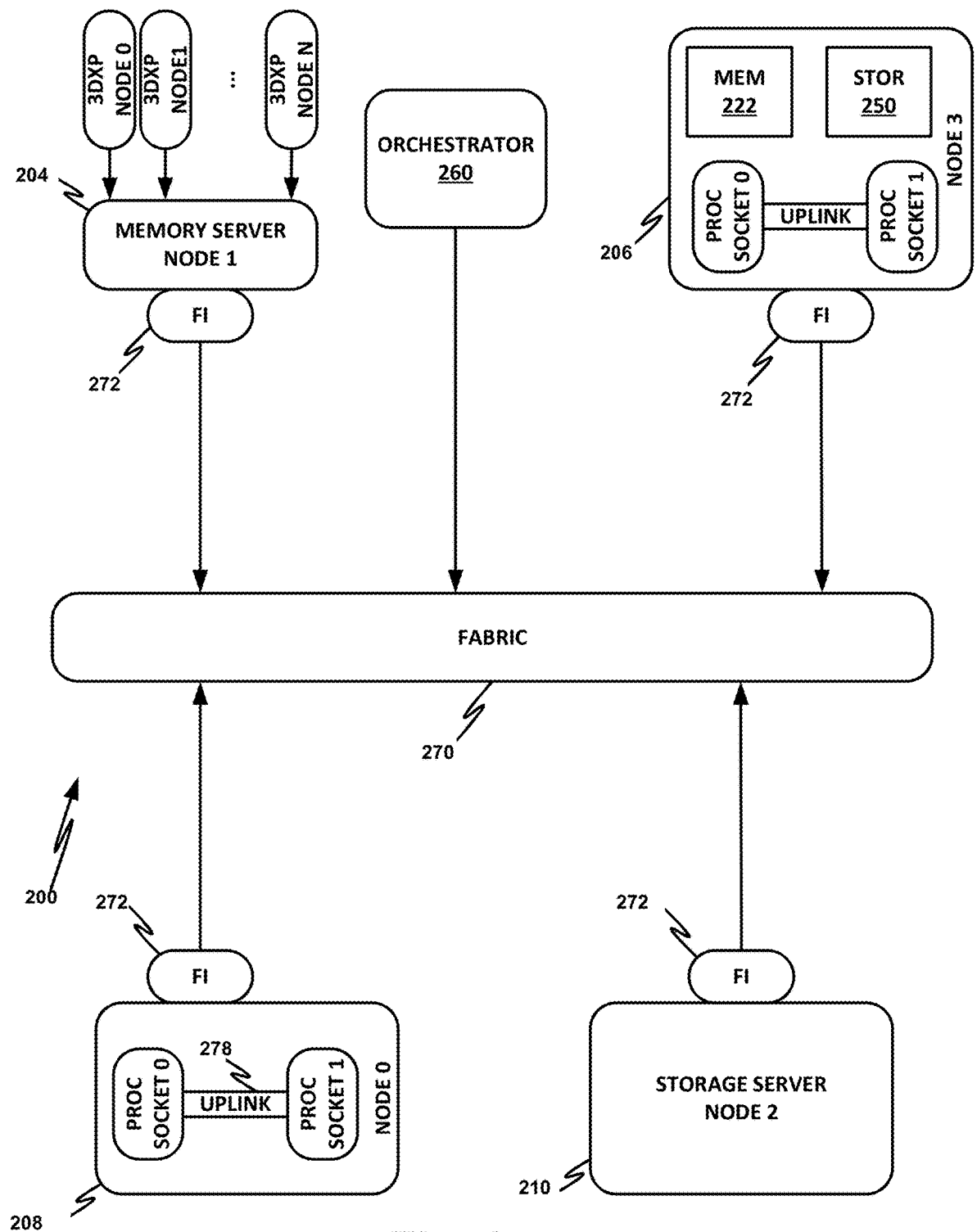
FIG. 2 is a block diagram of a data center, according to one or more examples of the present specification.

FIG. 2 is a block diagram of a data center 200 according to one or more examples of the present specification. Data center 200 may be, in various embodiments, the same data center as Data Center 100 of FIG. 1, or may be a different data center. Additional views are provided in FIG. 2 to illustrate different aspects of data center 200.

Data center 200 may be controlled by an orchestrator 260. Orchestrator 260 may provide, for example, software-defined networking (SDN), network function virtualization (NFV), virtual machine management, and similar services on data center 200. Orchestrator 260 may be a standalone appliance with its own dedicated processor or processors, memory, storage, and fabric interface. In another example, orchestrator 260 may itself be a virtual machine or virtual appliance. Orchestrator 260 may have a global view of data center 200, and may have the ability to manage and configure multiple services, such as dynamically allocating tenants, domains, services, service chains, virtual machines, virtual switches, and workload servers as necessary to meet present demands.

In this example, a fabric 270 is provided to interconnect various aspects of data center 200. Fabric 270 may be the same as fabric 170 of FIG. 1, or may be a different fabric. As above, fabric 270 may be provided by any suitable interconnect technology. In this example, Intel® OmniPath™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via a fabric interface 272. Fabric interface 272 may be any appropriate fabric interface as described above, and in this particular illustrative example, may be an Intel® HFI for connecting to an Intel® OmniPath™ fabric. In some examples, communication with fabric 270 may be tunneled, such as by providing UPI tunneling over OmniPath™.

Because data center 200 may provide many functions in a distributed fashion that in previous generations were provided onboard, a highly capable fabric interface 272 may be provided. Fabric interface 272 may operate at speeds of multiple gigabits per second, and in some cases may be tightly coupled with node 0 208. For example, in some embodiments, the logic for fabric interface 272 is integrated directly with the processors on a system-on-a-chip. This provides very high speed communication between fabric interface 272 and the processor sockets, without the need for intermediary bus devices, which may introduce additional latency into the fabric. However, this is not to imply that embodiments where fabric interface 272 is provided over a traditional bus are to be excluded. Rather, it is expressly anticipated that in some examples, fabric interface 272 may be provided on a bus, such as a PCIe bus, which is a serialized version of PCI that provides higher speeds than traditional PCI. Throughout data center 200, various nodes may provide different types of fabric interfaces 272, such as onboard fabric interfaces and plug-in fabric interfaces. It should also be noted that certain blocks in a system on a chip may be provided as intellectual property (IP) blocks that can be "dropped" into an integrated circuit as a modular unit. Thus, fabric interface 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a fabric interface 272, which provides fast communication that makes these technologies possible.

By way of further illustration, node 3 206 is also depicted. Node 3 206 also includes a fabric interface 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
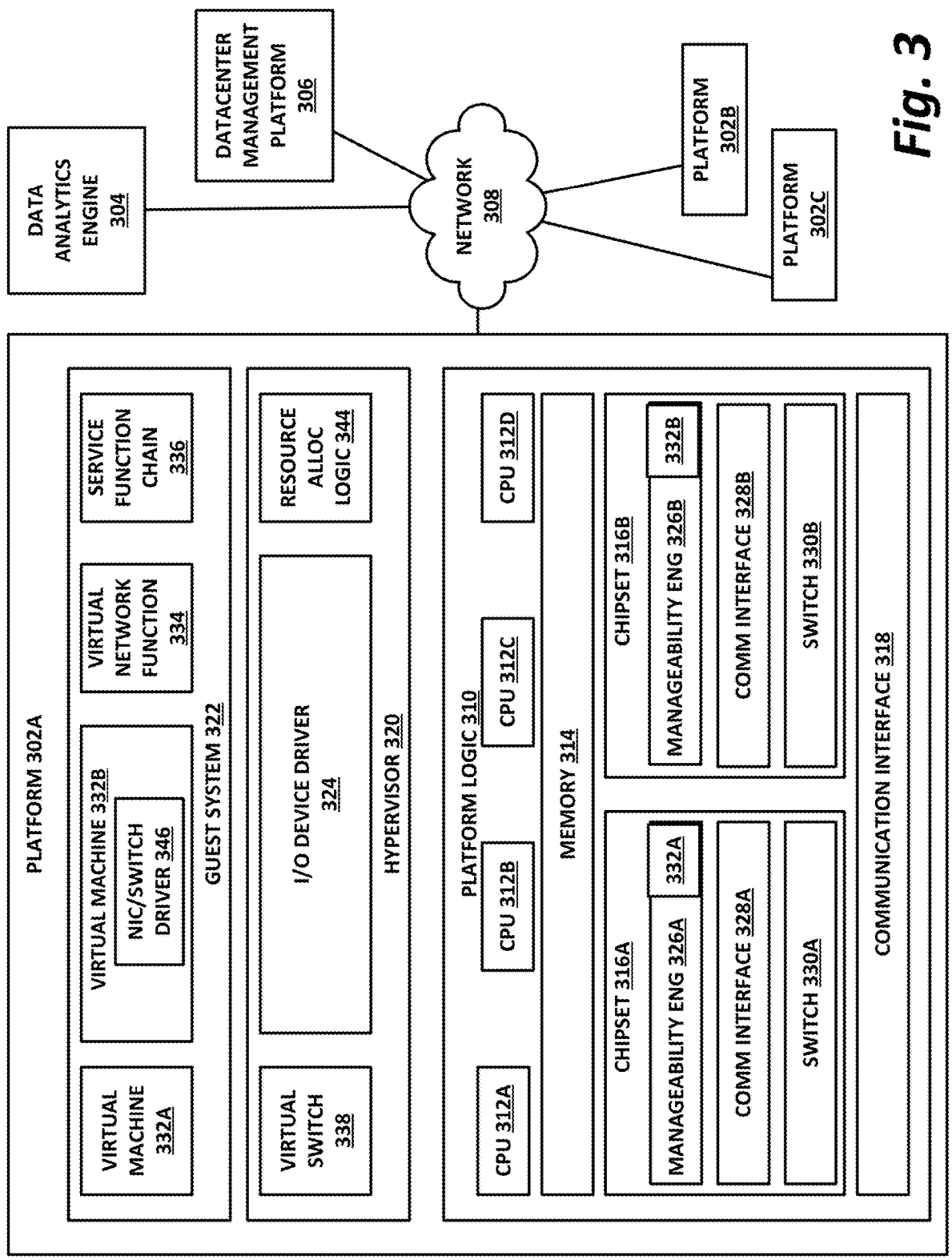
FIG. 3 illustrates a block diagram of components of a computing platform, according to one or more examples of the present specification.

FIG. 3 illustrates a block diagram of components of a computing platform 302A according to one or more examples of the present specification. In the embodiment depicted, platforms 302A, 302B, and 302C, along with a data center management platform 306 and data analytics engine 304 are interconnected via network 308. In other embodiments, a computer system may include any suitable number of (i.e., one or more) platforms. In some embodiments (e.g., when a computer system only includes a single platform), all or a portion of the system management platform 306 may be included on a platform 302. A platform 302 may include platform logic 310 with one or more central processing units (CPUs) 312, memories 314 (which may include any number of different modules), chipsets 316, communication interfaces 318, and any other suitable hardware and/or software to execute a hypervisor 320 or other operating system capable of executing workloads associated with applications running on platform 302. In some embodiments, a platform 302 may function as a host platform for one or more guest systems 322 that invoke these applications. Platform 302A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 306, hypervisor 320, or other operating system) of computer platform 302A may assign hardware resources of platform logic 310 to perform workloads in accordance with the stress information. In some embodiments, self-diagnostic capabilities may be combined with the stress monitoring to more accurately determine the health of the hardware resources. Each platform 302 may include platform logic 310. Platform logic 310 comprises, among other logic enabling the functionality of platform 302, one or more CPUs 312, memory 314, one or more chipsets 316, and communication interfaces 328. Although three platforms are illustrated, computer platform 302A may be interconnected with any suitable number of platforms. In various embodiments, a platform 302 may reside on a circuit board that is installed in a chassis, rack, or other suitable structure that comprises multiple platforms coupled together through network 308 (which may comprise, e.g., a rack or backplane switch).

CPUs 312 may each comprise any suitable number of processor cores and supporting logic (e.g., uncores). The cores may be coupled to each other, to memory 314, to at least one chipset 316, and/or to a communication interface 318, through one or more controllers residing on CPU 312 and/or chipset 316. In particular embodiments, a CPU 312 is embodied within a socket that is permanently or removably coupled to platform 302A. Although four CPUs are shown, a platform 302 may include any suitable number of CPUs.

Memory 314 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 314 may be used for short, medium, and/or long term storage by platform 302A. Memory 314 may store any suitable data or information utilized by platform logic 310, including software embedded in a computer readable medium, and/or encoded logic incorporated in hardware or otherwise stored (e.g., firmware). Memory 314 may store data that is used by cores of CPUs 312. In some embodiments, memory 314 may also comprise storage for instructions that may be executed by the cores of CPUs 312 or other processing elements (e.g., logic resident on chipsets 316) to provide functionality associated with the manageability engine 326 or other components of platform logic 310. A platform 302 may also include one or more chipsets 316 comprising any suitable logic to support the operation of the CPUs 312. In various embodiments, chipset 316 may reside on the same die or package as a CPU 312 or on one or more different dies or packages. Each chipset may support any suitable number of CPUs 312. A chipset 316 may also include one or more controllers to couple other components of platform logic 310 (e.g., communication interface 318 or memory 314) to one or more CPUs. In the embodiment depicted, each chipset 316 also includes a manageability engine 326. Manageability engine 326 may include any suitable logic to support the operation of chipset 316. In a particular embodiment, a manageability engine 326 (which may also be referred to as an innovation engine) is capable of collecting real-time telemetry data from the chipset 316, the CPU(s) 312 and/or memory 314 managed by the chipset 316, other components of platform logic 310, and/or various connections between components of platform logic 310. In various embodiments, the telemetry data collected includes the stress information described herein.

In various embodiments, a manageability engine 326 operates as an out-of-band asynchronous compute agent which is capable of interfacing with the various elements of platform logic 310 to collect telemetry data with no or minimal disruption to running processes on CPUs 312. For example, manageability engine 326 may comprise a dedicated processing element (e.g., a processor, controller, or other logic) on chipset 316, which provides the functionality of manageability engine 326 (e.g., by executing software instructions), thus conserving processing cycles of CPUs 312 for operations associated with the workloads performed by the platform logic 310. Moreover the dedicated logic for the manageability engine 326 may operate asynchronously with respect to the CPUs 312 and may gather at least some of the telemetry data without increasing the load on the CPUs.

A manageability engine 326 may process telemetry data it collects (specific examples of the processing of stress information will be provided herein). In various embodiments, manageability engine 326 reports the data it collects and/or the results of its processing to other elements in the computer system, such as one or more hypervisors 320 or other operating systems and/or system management software (which may run on any suitable logic such as system management platform 306). In particular embodiments, a critical event such as a core that has accumulated an excessive amount of stress may be reported prior to the normal interval for reporting telemetry data (e.g., a notification may be sent immediately upon detection).

Additionally, manageability engine 326 may include programmable code configurable to set which CPU(s) 312 a particular chipset 316 will manage and/or which telemetry data will be collected.

Chipsets 316 also each include a communication interface 328. Communication interface 328 may be used for the communication of signaling and/or data between chipset 316 and one or more I/O devices, one or more networks 308, and/or one or more devices coupled to network 308 (e.g., system management platform 306). For example, communication interface 328 may be used to send and receive network traffic such as data packets. In a particular embodiment, a communication interface 328 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 316 (e.g., manageability engine 326 or switch 330) and another device coupled to network 308. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 328 may allow communication of data (e.g., between the manageability engine 326 and the data center management platform 306) associated with management and monitoring functions performed by manageability engine 326. In various embodiments, manageability engine 326 may utilize elements (e.g., one or more NICs) of communication interfaces 328 to report the telemetry data (e.g., to system management platform 306) in order to reserve usage of NICs of communication interface 318 for operations associated with workloads performed by platform logic 310.

Switches 330 may couple to various ports (e.g., provided by NICs) of communication interface 328 and may switch data between these ports and various components of chipset 316 (e.g., one or more Peripheral Component Interconnect Express (PCIe) lanes coupled to CPUs 312). Switches 330 may be a physical or virtual (i.e., software) switch.

Platform logic 310 may include an additional communication interface 318. Similar to communication interfaces 328, communication interfaces 318 may be used for the communication of signaling and/or data between platform logic 310 and one or more networks 308 and one or more devices coupled to the network 308. For example, communication interface 318 may be used to send and receive network traffic such as data packets. In a particular embodiment, communication interfaces 318 comprise one or more physical NICs. These NICs may enable communication between any suitable element of platform logic 310 (e.g., CPUs 512 or memory 514) and another device coupled to network 308 (e.g., elements of other platforms or remote computing devices coupled to network 308 through one or more networks).

Platform logic 310 may receive and perform any suitable types of workloads. A workload may include any request to utilize one or more resources of platform logic 310, such as one or more cores or associated logic. For example, a workload may comprise a request to instantiate a software component, such as an I/O device driver 324 or guest system 322; a request to process a network packet received from a virtual machine 332 or device external to platform 302A (such as a network node coupled to network 308); a request to execute a process or thread associated with a guest system 322, an application running on platform 302A, a hypervisor 320 or other operating system running on platform 302A; or other suitable processing request.

A virtual machine 332 may emulate a computer system with its own dedicated hardware. A virtual machine 332 may run a guest operating system on top of the hypervisor 320. The components of platform logic 310 (e.g., CPUs 312, memory 314, chipset 316, and communication interface 318) may be virtualized such that it appears to the guest operating system that the virtual machine 332 has its own dedicated components.

A virtual machine 332 may include a virtualized NIC (vNIC), which is used by the virtual machine as its network interface. A vNIC may be assigned a media access control (MAC) address or other identifier, thus allowing multiple virtual machines 332 to be individually addressable in a network.

VNF 334 may comprise a software implementation of a functional building block with defined interfaces and behavior that can be deployed in a virtualized infrastructure. In particular embodiments, a VNF 334 may include one or more virtual machines 332 that collectively provide specific functionalities (e.g., wide area network (WAN) optimization, virtual private network (VPN) termination, firewall operations, load-balancing operations, security functions, etc.). A VNF 334 running on platform logic 310 may provide the same functionality as traditional network components implemented through dedicated hardware. For example, a VNF 334 may include components to perform any suitable NFV workloads, such as virtualized evolved packet core (vEPC) components, mobility management entities, 3rd Generation Partnership Project (3GPP) control and data plane components, etc.

SFC 336 is a group of VNFs 334 organized as a chain to perform a series of operations, such as network packet processing operations. Service function chaining may provide the ability to define an ordered list of network services (e.g. firewalls, load balancers) that are stitched together in the network to create a service chain.

A hypervisor 320 (also known as a virtual machine monitor) may comprise logic to create and run guest systems 322. The hypervisor 320 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 310. Services of hypervisor 320 may be provided by virtualizing in software or through hardware assisted resources that require minimal software intervention, or both. Multiple instances of a variety of guest operating systems may be managed by the hypervisor 320. Each platform 302 may have a separate instantiation of a hypervisor 320.

Hypervisor 320 may be a native or bare-metal hypervisor that runs directly on platform logic 310 to control the platform logic and manage the guest operating systems. Alternatively, hypervisor 320 may be a hosted hypervisor that runs on a host operating system and abstracts the guest operating systems from the host operating system. Hypervisor 320 may include a virtual switch 338 that may provide virtual switching and/or routing functions to virtual machines of guest systems 322. The virtual switch 338 may comprise a logical switching fabric that couples the vNICs of the virtual machines 332 to each other, thus creating a virtual network through which virtual machines may communicate with each other.

Virtual switch 338 may comprise a software element that is executed using components of platform logic 310. In various embodiments, hypervisor 320 may be in communication with any suitable entity (e.g., a SDN controller) which may cause hypervisor 320 to reconfigure the parameters of virtual switch 338 in response to changing conditions in platform 302 (e.g., the addition or deletion of virtual machines 332 or identification of optimizations that may be made to enhance performance of the platform).

Hypervisor 320 may also include resource allocation logic 344, which may include logic for determining allocation of platform resources based on the telemetry data (which may include stress information). Resource allocation logic 344 may also include logic for communicating with various components of platform logic 310 entities of platform 302A to implement such optimization, such as components of platform logic 310.

Any suitable logic may make one or more of these optimization decisions. For example, system management platform 306; resource allocation logic 344 of hypervisor 320 or other operating system; or other logic of computer platform 302A may be capable of making such decisions. In various embodiments, the system management platform 306 may receive telemetry data from and manage workload placement across multiple platforms 302. The system management platform 306 may communicate with hypervisors 320 (e.g., in an out-of-band manner) or other operating systems of the various platforms 302 to implement workload placements directed by the system management platform.

The elements of platform logic 310 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 302A may be coupled together in any suitable manner such as through one or more networks 308. A network 308 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 4:
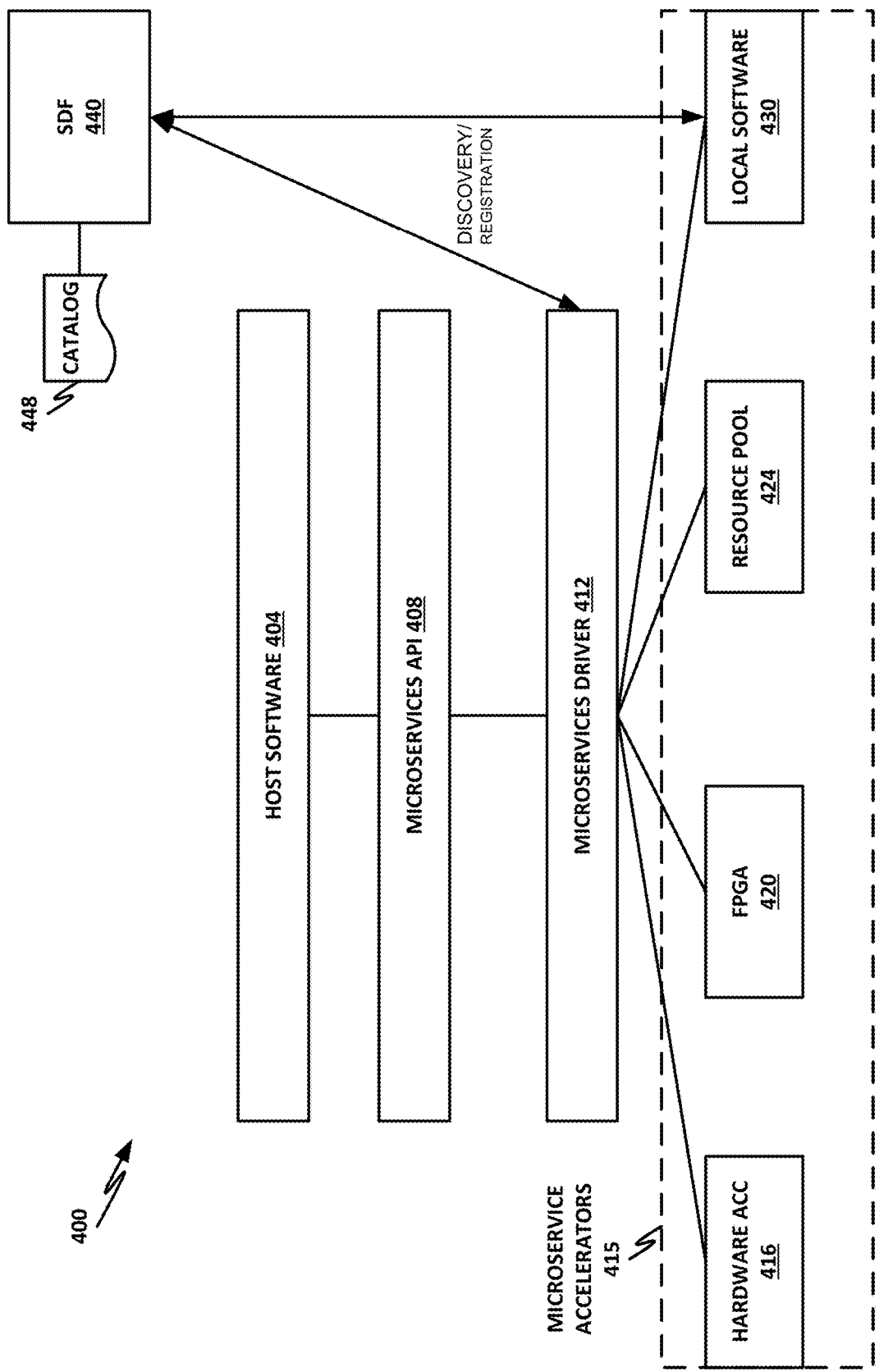
FIG. 4 is a block diagram of a microservices architecture, according to one or more examples of the present specification.

FIG. 4 is a block diagram of a microservices architecture according to one or more examples of the present specification. In this case, microservices architecture 400 includes host software 404 running on a compute node in a data center, which may include a VM hosted on a hardware platform. Host software 404 may require access to various resources, such as nonvolatile storage, persistent fast memory, FPGAs, and other suitable services. In an illustrative example, microservices architecture 400 provides a security function, such as fabric flow-through microservice for non-repudiation to provide proof of the integrity or origin of data.

In an example, host software 404 may need to flow fabric traffic through a microservice to encrypt and sign the traffic, and then on-the-fly DMA (direct memory access) the traffic into persistent memory, before forwarding it to the next hop.

In this example, a plurality of microservice accelerators 415 are available, including local software 430, resource pool 424, FPGA (or FPGA pool) 420, and hardware accelerator 416. Note that the microservice accelerators 415 disclosed here are provided as nonlimiting examples only, and hardware accelerators 415 may also include any other device or function configured to provide the microservice.

Local software 430 may be software running under the same operating system as software 404. In other words, local software 430 may be a subroutine or module running on the same platform hardware as host software 404.

Resource pool 424 may be a resource pool, such as may be provided on a compute sled or in a compute rack, wherein a large number of identical or nearly identical resources are provided and provisioned dynamically to other nodes in the data center. This could include a memory server, including a PFM server, a storage server, or various accelerator or other resources.

An FPGA pool 420 is also available, with a number of FPGAs that can be dynamically provisioned and programmed to carry out desired microservices function.

Hardware accelerators 416 may also be provided. Hardware accelerators 416 may include ASICs, SoCs, or other dedicated hardware that performs a function at very high speed relative to software.

When each resource comes online, it may register with a service discovery function (SDF) 440. SDF 400 may be a separate VM running in the data center, may be a module or function of an orchestrator (e.g., orchestrator 260 of FIG. 2).

For example, local software module 430 may come online, and register with SDF 440. This registration may include the capability of the function (in this case providing encryption and signing for non-repudiation). It may include the nature of the instance and how it is carried out (for example, in software running on a quad core Intel® Xeon™ processor with two cores available to be dedicated to the encryption and signing function). It may also register with SDF 440 details of how each function call should be formatted for interoperability with local software 430.

Similarly, resource pool 424, FPGA 420, and hardware accelerator 416 may also register their capabilities with SDF 440. SDF 440 stores all of these in catalog 448. Note that in the case of FPGA 420, for example, registration with SDF 440 may include not only the ability of FPGA 420 to perform encryption and signing, but also a gate configuration for configuring FPGA 420 with the logic for performing the function, and mappings of pins or ports to input and output functions.

In this example, local software 430, resource pool 424, FPGA pool 420, and hardware accelerator 416 may all provide (or may be configured to provide) an identical or nearly identical function, such as a non-repudiation microservice requiring encryption and signing.

Taking non-repudiation as an example, host software 404 could simply perform the encryption and signing onboard via its own software stack. However, this may be computationally inefficient and resource intensive, and may cause the service to become a bottleneck in the network flow. Offloading the function to an accelerator may be more efficient, faster, and may ensure that packets traverse the data center more smoothly. However, at design time, a programmer of host software 404 may not know which non-repudiation acceleration capabilities will be available.

Thus, to increase the efficiency of host software 404, rather than call its own native subroutine, or attempt to anticipate the exact resources that will be available in the data center, host software 404 may issue a call to microservices API 408, which may be a uniform "cloud friendly" API. Rather than targeting a specific platform or device, the call to microservices API 408 may be formatted according to a standardized form (e.g., a single "Service.Nonrepudiation ([parameters])" method call that is uniform across resource instances. This may sandwich dynamic dispatch and binding of functions behind microservices API 408, and allow microservices to be accessed with unified addressing. Some functions in catalog 448 may be selected, or selection may be assisted, by an ontological cataloging of properties.

Microservices API 408 communicates with microservices driver 412, which queries SDF 440 to identify a best available microservice instance for carrying out the non-repudiation function. The identification of a best available instance may include such factors as the priority of host software 404 in the overall data center, loading on existing instances of the microservice function, the relative speeds of the instances, and any other factor that may be used to optimize the overall function of the data center.

Consider, for example, a case where hardware accelerator 416 provides the fastest processing for encryption and signing functions. This may be because hardware accelerator 416 is implemented completely in hardware, and is thus very fast. However, other nodes in the data center may already be using instances of hardware accelerator 416 at or near their optimum capacity. Thus, introducing a new flow into hardware accelerator 416, rather than optimizing data center resources, may in fact become an additional burden on data center resources. Instead, microservices driver 412, in communication with SDF 440, may identify an FPGA pool 420 as the best available resource for carrying out the encryption and signing microservice. Thus, rather than place an additional burden on hardware accelerator 416, microservices driver 412 may receive from SDF 440 via catalog 448 a gate configuration for allocating one or more FPGAs in FPGA pool 420 to carry out the encryption and signing function. Note, however, that microservices driver 412 may not be the agent that actually carries out the programming of the FPGA. That function may be delegated to specialized hardware, and the instructions to carry out the programming may come from microservice driver 412, from the orchestrator, or from any other device configured to effect the FPGA programming. Once one or more FPGAs have been allocated and programmed, they may then continue to operate on flows coming into host software 404 until the microservices posture of the system changes, and there is a need to reallocate microservice instances.

Note that in this example, microservices driver 412 provisions not only the services but also flows associated with the service. This ability to dynamically define flows of messages leads to a concept of chaining, the benefit of which is to pipeline invocations of multiple microservices and thus reduce latency build-up. Instead of an application waiting for completions to an invocation of a function, the microservices can simply be chained together in a single flow.

For example, if a service chain is defined where incoming packets are first decrypted and their signatures verified, and then packets are subjected to DPI, microservices driver 412 may provision not only an instance of the decapsulation and signing microservice, but also an instance of the DPI microservice. These instances are provisioned such that when the decapsulation and signature check function is complete, the result need not be passed back to host software 404, to then invoke an instance of DPI via microservices API 408. Rather, when microservices driver 412 provisions both of the services, it can create an interface between them, so that once the decryption microservice finishes decrypting the packet, it can provide the decrypted packet directly to the DPI microservice instance. The DPI microservice instance can then perform its DPI function, and either send the result back to host software 404, or if there is another microservice in the chain, forward the packet to the next microservice.

Figure 5:
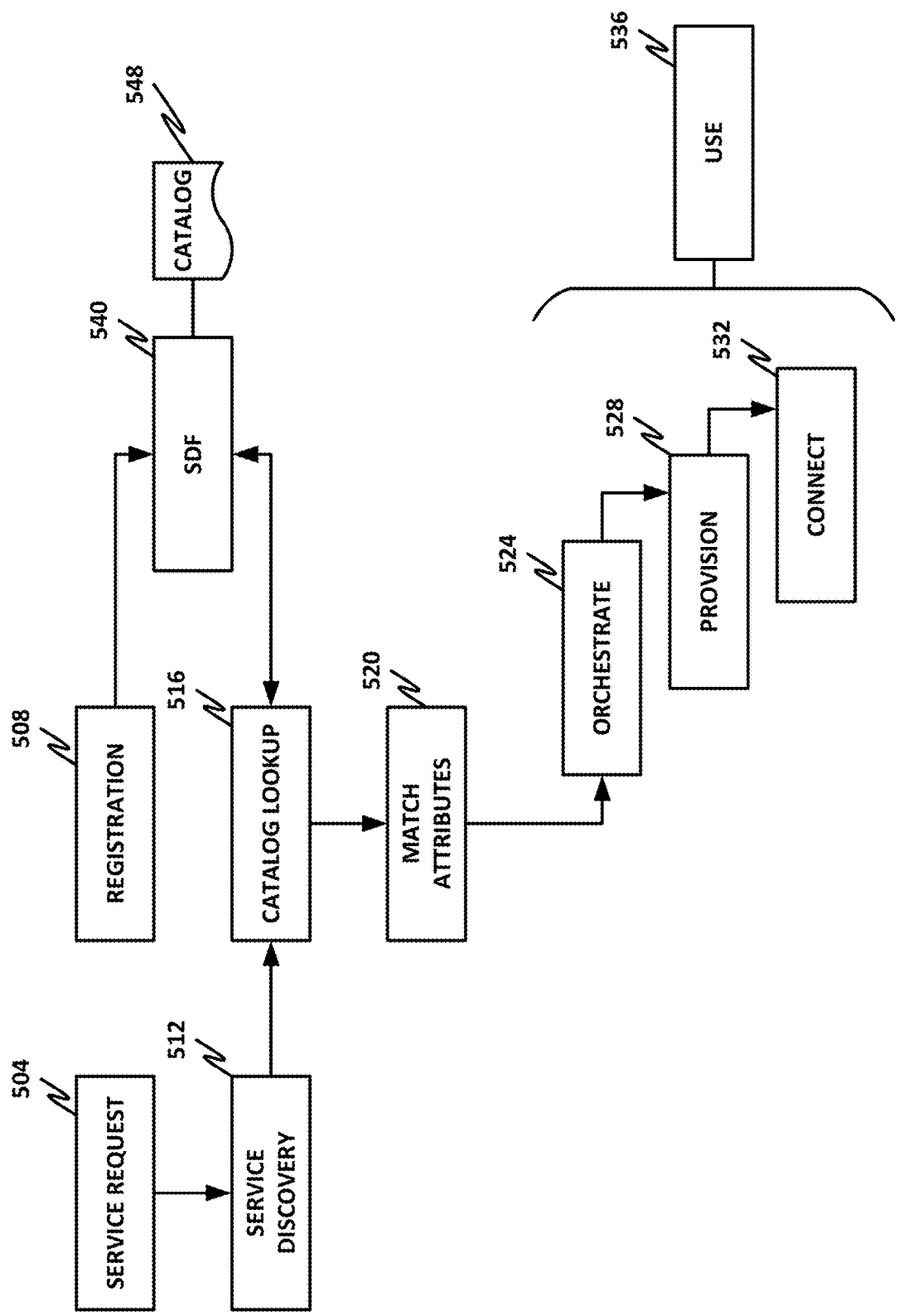
FIG. 5 is a flow diagram of a method for registering and using microservices, according to one or more examples of the present specification.

FIG. 5 is a flow diagram of a method 500 for registering and using microservices according to one or more examples of the present specification.

In block 508, a number of microservices or microservice-capable resource registers with SDF 540. SDF 540 may store the registered instances in an ontological catalog 548.

In block 504, an application makes a microservices discovery request for a specific function described in the ontological model. This request is sent to a service discovery module 512.

In block 516, the service discovery module performs a catalog lookup via SDF 540. SDF 540 provides a list of available microservice instances, including attributes of each instance.

In block 520, a microservices driver may match attributes from catalog 548 to the requirements of the instance service request 504.

If a sufficient instance is available with sufficient bandwidth, then in block 524, the microservices driver may orchestra access to the instance, such as providing a new endpoint uniform resource identifier (URI) for the host software to access the microservice instance.

If no instance is available, then in block 528, the microservices driver may provision a new instance, and communication with that new instance may be orchestrated with the service request.

In block 532, the requesting host software may be connected to the microservice instance. This could include, for example, a simple handshake so that each is aware that it is communicating with the other.

Finally, in block 536, the host service begins using the provisioned microservice instance, for example, by switching a packet to the provided URI.

Note that in this basic scenario, both the implementation and the path to it were dynamic, and the application itself is agnostic of the method of instantiating the best fit implementation of the function and the optimal method of communicating with the function.

Figure 6:
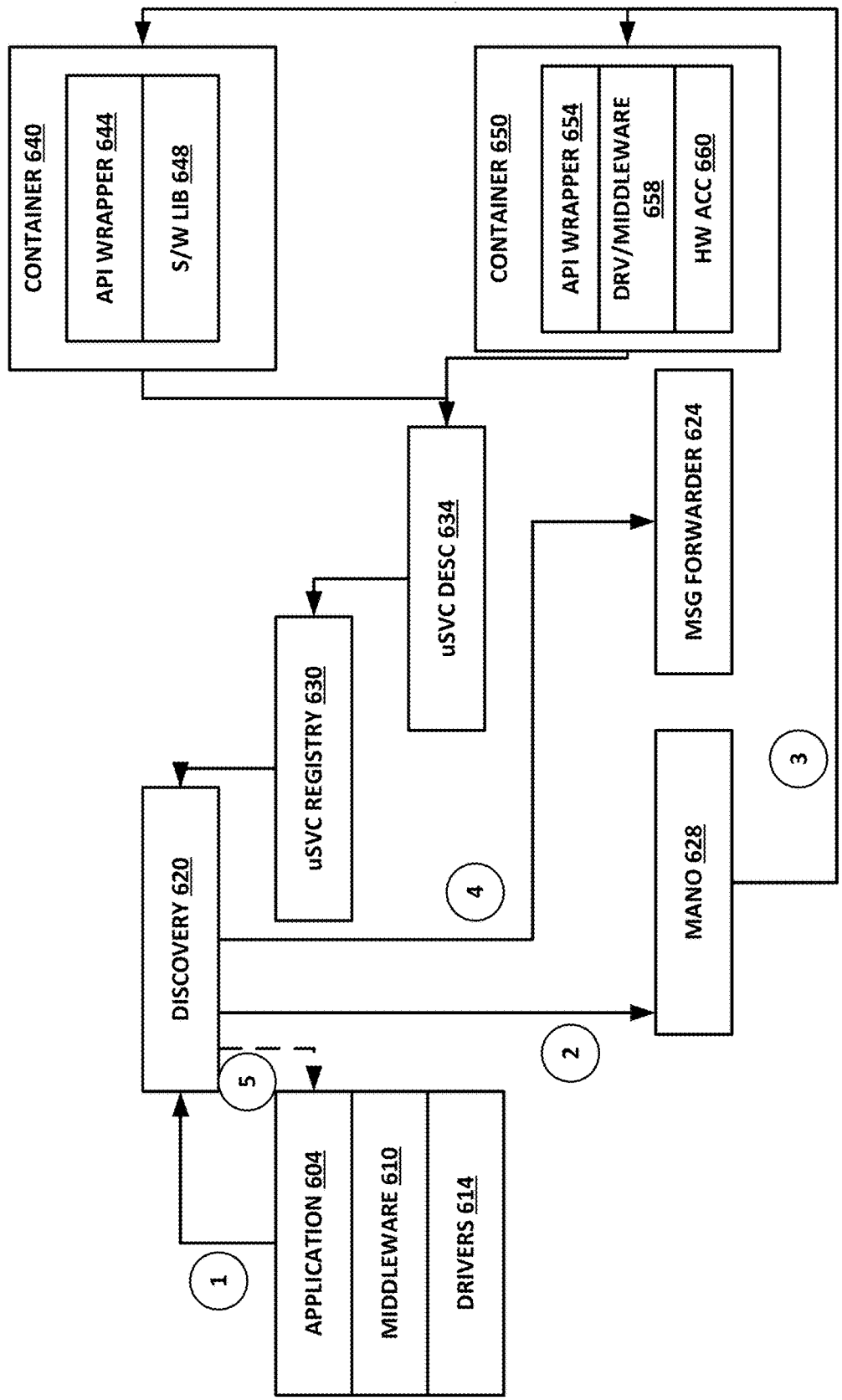
FIG. 6 is a block diagram of initial setup of a microservices instance, according to one or more examples of the present specification.
Figure 7:
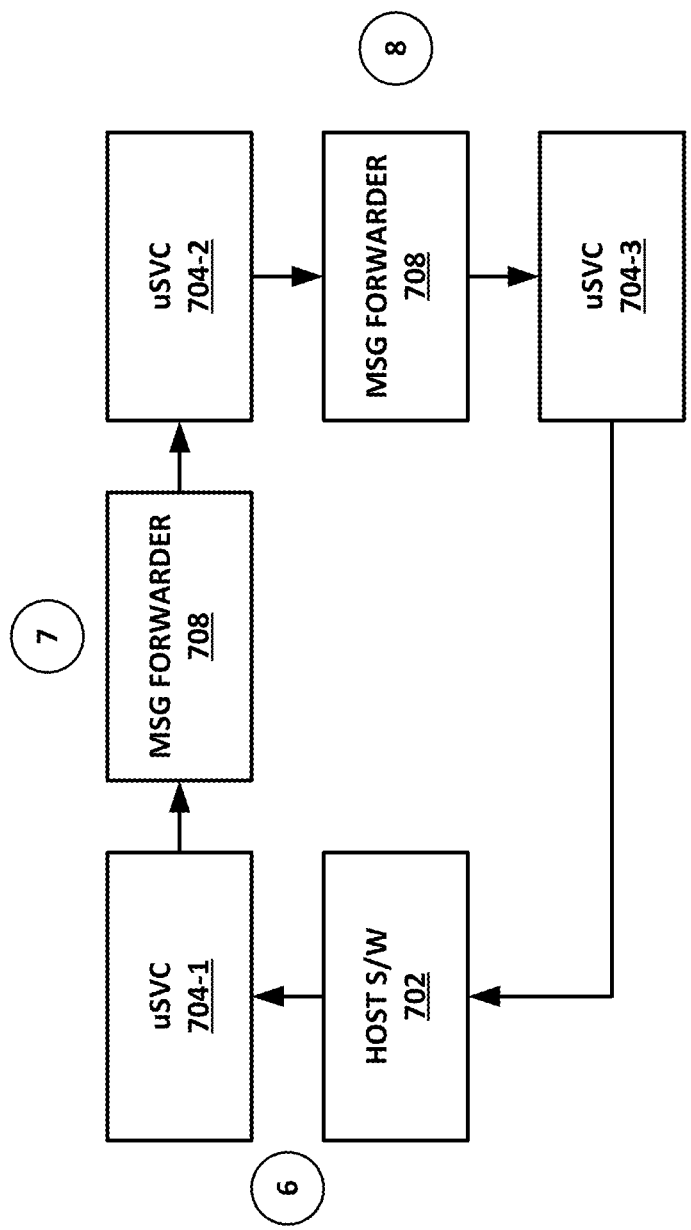
FIG. 7 is an illustration of operation of microservices which may be considered an extension of the block diagram of FIG. 6, according to one or more examples of the present specification.

Subsequent FIGS. 6 and 7 illustrate additional details of a microservices architecture, which FIG. 6 illustrating a first-time setup of a microservice instance, and FIG. 7 illustrating later use of the microservices instance.

FIG. 6 is a block diagram of initial setup of a microservices instance according to one or more examples of the present specification. In this case, an application 604 employs middleware 610 to communicate with drivers 614. Application 604 has a need to access a microservice.

At operation 1, application 604 places a microservices discovery request with the microservices driver. The microservices driver may then issue a discovery request 620 via the fabric. Further in block 620, the microservices driver may select a desired implementation option, such as a hardware accelerator, FPGA, or resource pool, and issue a request to a management and network orchestration (MANO) server (e.g., orchestrator 260), which may provide the SDF in this case.

In operation 3, MANO 628 launches or otherwise provisions an instance of the desired microservice instance. This could include, for example, an application container 640 with an API wrapper 644 and a software library 648. In another example, this includes an application container 650, with an API wrapper 654, a driver or middleware 658, and a hardware accelerator 660.

The appropriate attributes of the provided instance are encapsulated in a microservices description 634, which is registered in microservices registry 630.

In operation 4, a message forwarder 624 is set up to enable application 604 to communicate with the new instance of the microservice. This may be, for example, a dynamic message forwarder of the necessary type. Message forwarder 624 can be implemented as a configuration of a fabric connecting an application to appropriate microservices (network, bus, etc.). In such an embodiment, forwarding would be a 'passive' transfer of data.

In operation 5, the necessary linkage is completed between message forwarder 624 and application 604, providing an open line of communication between the application and the microservice instance. This provides a linkage for requesting an instance of the task provided by the microservice both presently and for future flows, as further illustrated in FIG. 7 (such as in operations 6 and 7).

In general, a chain of microservice invocations may be built up by continuing to repeat this operation such that each instance of a microservice is dynamically chosen and customized for direct communication from its predecessor microservice instance in the chain. Thus, the setting up of message forwarder 624 in the case of a microservices chain provides linkage in some cases not between application 604 and the microservice, but rather between a preceding microservice and the next microservice in the service chain. As with application 604, each predecessor microservice may be agnostic of the implementation details of its successor microservice, and of the details for providing a best path for producing the invocation.

FIG. 7 is an illustration of operation of microservices which may be considered an extension of the block diagram of FIG. 6.

In the example of FIG. 7, host software 702 has requested the provisioning of a plurality of microservices, namely microservice 704-1, microservice 704-2, and microservice 704-3.

In operation 6, host software 702 accesses microservice 704-1, such as by providing a data flow to the URI associated with microservice 704-1.

Microservice 704-1 receives the flow from host software 702, and performs its designated microservice on the flow. For example, microservice 704-1 could provide decryption and key verification on incoming packets.

Microservice 704-1 in operation 7 now operates message forwarder 708 to forward the packet to microservice 704-2.

Microservice 704-2 may be, for example, a DPI microservice that performs a detailed analysis of the incoming packet.

Once microservice 704-2 finishes its deep packet inspection, it operates another message forwarder 708 to forward the packet to microservice 704-3.

Microservice 704-3 may perform some other auxiliary function, such as a statistical or big data function that does not affect the value of the packet but that is used for managing the data center and services provided to customers.

Once microservice 704-3 has completed its function, it returns the packet to host software 702, which may now handle the packet according to its normal process.

In the example of FIG. 7, message forwarder 708 may be a single, monolithic message forwarder that provides interconnection between microservice instances (similar to a lightweight vSwitch purpose-built for forwarding packets between microservices), so that message forwarder 708 acts as a hub between microservices. In another example, each microservice instance may have its own dedicated connection to other microservices, so that microservices are "daisy chained" to each other without the need for any intermediary hub.

Note that in this case, an entire service chain has been applied to the packet after it hit host software 702, without the packet needing to "ping-pong" back and forth between host software 702 and the various microservices in the service chain. Note also that the use of microservices enables host software 702 to treat the various functions in the service chain as though they were a single call to an instance of a local module. Thus, rather than explicitly accessing a number of accelerators, wherein the packet is sent to an accelerator, returned to the host, sent to a second accelerator, returned to the host again, sent to a third accelerator, and returned to the host a third time, a series of accelerators are used in a chain and invoked by a single function call from host software 702.

Note that the diagrams and flows disclosed in FIGS. 5-7, for example, provide abstraction of hardware such as low-level accelerators behind a common microservices API. This provides for both local and remote execution, flexible addressing, and invocation. The ontology described for the registration catalog may be provided in an extensible language for defining and discovering microservices based on the desired functionality of the microservices. For example, one feature of the ontological language could be a descriptor such as "function equals encrypt (AES-GCM)." Thus, the application can specify the desired function and parameters such as the type of encryption, without specifying particular implementation details. However, in some cases some details may be provided, such as a maximum acceptable latency, a minimum acceptable bandwidth, or other factors that may affect performance that may be required by a particular application. The ontological language may also support the chaining of subfunctions in its grammar. In one embodiment, the ontological language may be compatible with OpenAPI and may provide easy discovery by humans and by computers.

The following will illustrate several building blocks of realizing the microservices architecture described above. These will include specific descriptions of the following:

Note that the diagrams and flows disclosed in FIGS. 5-7, for example, provide abstraction of hardware such as low-level accelerators behind a common microservices API. This provides for both local and remote execution, flexible addressing, and invocation. The ontology described for the registration catalog may be provided in an extensible language for defining and discovering microservices based on the desired functionality of the microservices. For example, one feature of the ontological language could be a descriptor such as "function equals encrypt (AES-GCM)." Thus, the application can specify the desired function and parameters such as the type of encryption, without specifying particular implementation details. However, in some cases some details may be provided, such as a maximum acceptable latency, a minimum acceptable bandwidth, or other factors that may affect performance that may be required by a particular application. The ontological language may also support the chaining of subfunctions in its grammar. In one embodiment, the ontological language may be compatible with open API and may prevent easy discovery by humans and by computers.

The following will illustrate several building blocks of realizing the microservices architecture described above. These will include specific descriptions of the following:

Uniform APIs and uniform addressing, as further described below.
Microservice registration (SR), as further described below.
Microservice discovery (SD), as further described below.
Uniform access methods, as further described below.
Middleware and drivers, as further described below.
Message forwarders, as further described below.
Microservice chaining, as further described below.
Microservice discovery endpoint (SDE), as further described below.
Messaging service (MS), as further described below.
Microservice request, as further described below.
Addressing service (AS), as further described below.
Microservices description catalog, as further described below.
Message service path configuration, as further described below.
Message service flow, as further described below.
Load-balancing engine (LBE), as further described below.

For uniform APIs in uniform addressing, in which case open API may be used to define a standard, language agnostic interface to representational state transfer (REST) APIs, which allows both humans and computers to discover the capabilities of a microservice and understand and interact with it remotely with minimal implementation logic. Additional details are found in the description of the addressing service as described below.

The microservices registration (SR) mechanism allows further discovery of services based on their descriptions. A vendor or builder of a service may provide details on endpoints and descriptions of services in the extensible language, with possible combinations of functions, telemetry details, licensing and metering details, scalability and instantiation, and access methods by way of nonlimiting example.

Registration may be part of a configuration file or a database. Additional details are located in the description of the microservices descriptions catalog below.

Microservice discovery (SD) identifies available services when requested, including the identity of a best instance or optimal instance, or the option to spawn a new instance if possible, as well as the configuration of chaining and services. SD may be accessed via a known mechanism or address, such as a specific URI or other mechanism that may be part of a middleware or SDK. The SD function locates services capable of a requested function and configures specific service instances and message forwarders for transferring data between the requesting application and the service instance, or different service instances in a service chain. When the instance is invoked by an application, the microservice may forward its output either to the invoking software or to a next service in the service chain. Upon request from the application, the SD function may use an existing instance or spawn a new instance if supported by the implementation. The SD function may also serve as a load balancer, optionally in addition to dynamic load-balancing performed by a message forwarder, and work with MANO on creating and removal of instances. The MANO may use details of locality and preferences and platform capabilities to spawn a best fit instance of a hardware or software service. See additional details in the description of SDE below.

The unified access method allows the use of best possible invocation methods depending on the location of a service and the capabilities of the environment. In one example, microservices are accessed via REST APIs running over the network. However, in other instances, access may be through another mechanism such as remote direct memory access (RDMA), shared memory, memory-mapped input/output (MMIO), or similar. Unified access may be extensible and may accommodate different access methods, and in some examples may be handled in middleware components.

Middleware components and kernel drivers may be used for handling unified access, thus abstracting the access from the actual implementation. In some cases, these components are existing parts of a cloud infrastructure.

Message forwarders may be provisioned during microservice discovery and provisioning, and may include details of which services are requested. The message forwarder may configure instances of services to perform forwarding to the next service. This creates the notion of a service flow. Additional details related to the message forwarder are described in connection with the message service path configuration below, and message service flow description below.

Note that an application using microservice discovery to find endpoints and access methods can invoke them during processing. To an application, the use of microservices may be as simple as issuing a subroutine call, which is transparently handled by the microservice driver, via a message forwarder which brokers, load balances, and/or bridges requests to the right microservice instance. The use of the message forwarder may be defined by policy as further described in the description of the message service flow below. Message service chaining is further illustrated in connection with FIG. 8.

Figure 8:
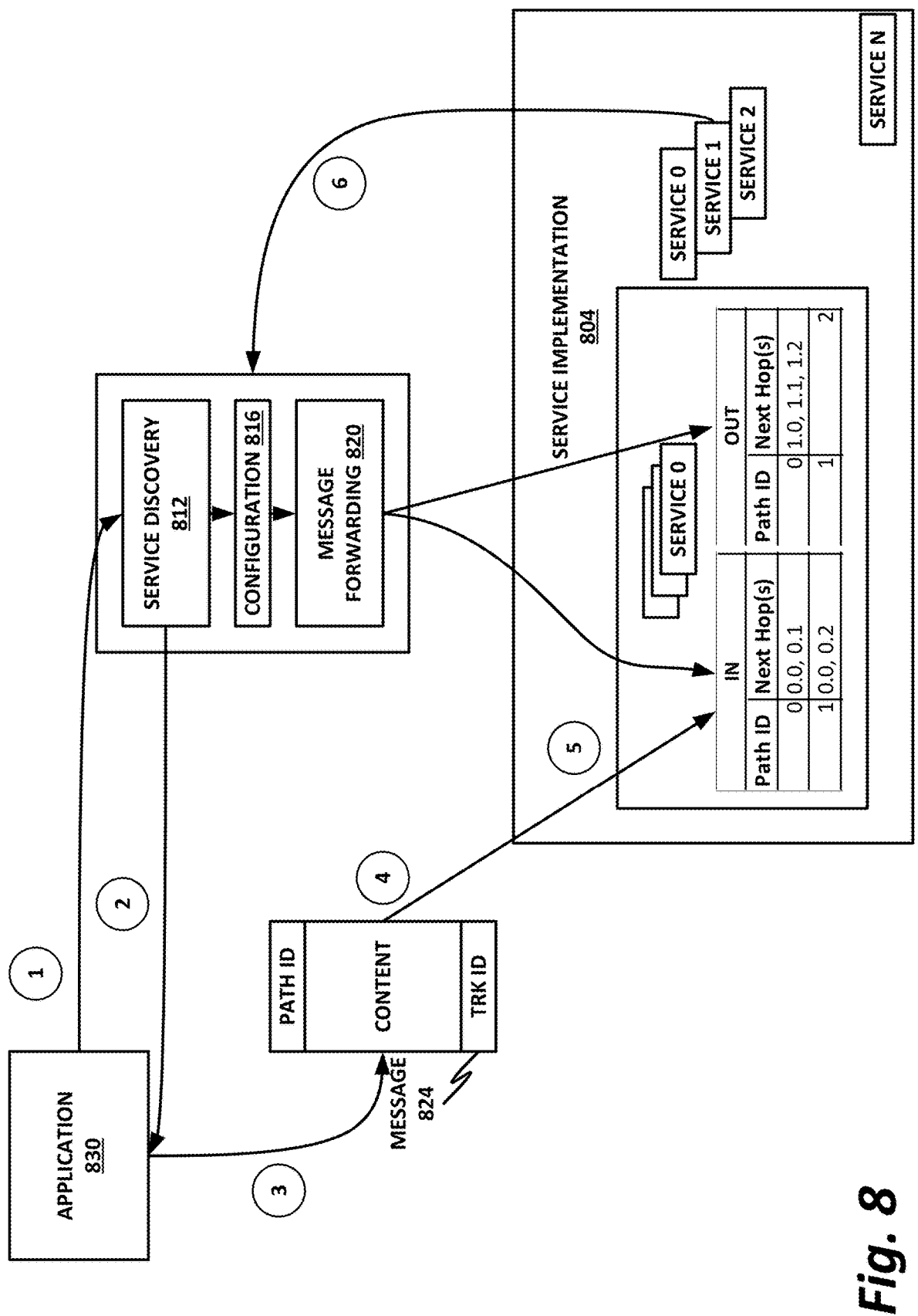
FIG. 8 is a block diagram of message service chaining, according to one or more examples of the present specification.

FIG. 8 is a block diagram of message service chaining according to one or more examples of the present specification. Message service chaining is a method for exposing functionality of hardware and software accelerators in a cloud friendly way by using microservices with a unified addressing scheme. Registration of a microservice may include registration of a microservice connection capability indicating an ability of the microservice instance to communicate directly with other instances of the same or a different microservice.

At operation 1, application 830 issues a request for the function to service discovery block 812.

At operation 2, service discovery 812 responds with a get path ID to application 830 to provision the function and entry point.

Service discovery function 812 then accesses configuration 816 and message forwarding data 820 to provision the appropriate service chain. This may include provisioning a service implementation 804 including a plurality of services 0 through n. Each service may include a path ID and a next hop URI.

At operation 3, application 830 builds a message 824, which may include a path ID, message content, and tracking ID. At operation 4, application 830 sends message 824 to service implementation 804.

At operation 5, service implementation 804 provisions the appropriate chain of microservices, and begins propagating message 824 through the microservices.

At operation 6, service implementation 804 may optionally return a completion status to the message forwarding block 820.

The service discovery endpoint provides an extensible infrastructure for discovery of available services independent of their implementation and locality. This supports drop-in replacements and optimizations based on application preferences, type of workload, and combination of services.

In this context, the term "endpoint" means a known API used by an application to perform a function. The service discovery is exposed to the application in different combinations, such as, by way of nonlimiting example:

A special URL or URI as the entry point.

A PCI or PCIe device, whether a real device or emulated device, addressed with B/D/F with defined encodings and data formats for messages. This allows easy virtualization using virtio-like devices or SR-IOV, (in the case of hardware implementations) with ioctl-based API, cHr-DeV, or a pseudo-NIC.

System calls or other libraries for low latency calls. Service discovery endpoints in some cases may be hardcoded, or may be part provided as part of a cloud INIT script or similar.

Figure 9:
FIG. 9 is a block diagram of service discovery, according to one or more examples of the present specification.

FIG. 9 is a block diagram of service discovery according to one or more examples of the present specification. In the case of a service request, an application requests a specific function from the messaging service (i.e., the microservice discovery function (MDF)) by providing a description of the function being performed or desired to be performed. This is seen in FIG. 9, wherein service discovery function 900 receives as an input a description of the desired service. This may be a single function or a sequence of functions to be applied to the same message in a service chain. In another example, this may be an enumerated list of desired capabilities. In one example, open API may be used for this purpose, although this is a nonlimiting example. The description of services may be provided in different ways or formats, and required functions may be provided in addition to other information such as function-specific parameters or desired performance parameters. The output of service discovery function 900 may include a path ID to use for the service, details of the endpoint, and available options.

For the addressing service, a unified addressing scheme may be used to provide the same calling convention to request either remote or local resources, as well as either hardware or software microservices as appropriate. The unified addressing service may be implemented by redirecting calls and providing data transfers to the actual instance. The application itself may be agnostic to the instance and its location or implementation details. These may be mapped to multiple load balanced instances to support autoscaling. An endpoint, such as a call to a local host URL by way of example, in this approach may be an entry point to a message forwarder. The message forwarder may process the input parameters of the message, such as the path ID, and translate them into an actual runtime invocation of the microservice instance.

The microservices description catalog may be used for registration of services. When they become available, a new microservice implementation and instance may be registered to the service discovery function. A registration may include as inputs a description of the provided services, description of capabilities including such items as scaling options, resource sharing, and datatypes clock, and may also include telemetry data, quality factors, and similar. Output of the registration may include a confirmation status.

Registry of a microservice may include configuration of an entry point, meaning a description of how to invoke the service, a description of supported functions, and SLA details by way of nonlimiting example. For example, when a specific package for an FPGA is loaded, it may be registered as a microservice to enable consumption by applications and marked as preferable, while software implementations may still accept messages as necessary. New instances may also be added transparently to calling applications, which access the microservices by path ID rather than by instance ID. Dynamic allocation of new instances may be supported to enable autoscaling.

Services may also use an API for telemetry to report their usage, load, and any issues they encounter. In some cases, named spaces and context may be supported for isolation of VMs or function domains. Advantageously, no changes to the device itself are required in this case.

Using Intel® Quick Assist™ as an example, instead of using SR-IOV to map a device in VM, the architecture of the present specification allows an instance of an SSL microservice to be implemented as a wrapper on a QAT instance and furnished an access point such as a URI. When an application needs to encrypt or decrypt data, it forms a message specifying data to be processed and the encryption or decryption function to be used. Rather than the packet being returned to the requesting application, the next destination may be an Ethernet microservice that actually sends the encrypted content over the wire.

In the case of message service path configuration, during microservices discovery, when an application requests a specific function, the messaging service may perform the following:

Validate that the requested function is supported.

Allocate a path ID for the requested sequence of functions and return the path ID for later use by the application.

Allocate resources to enable streaming processing (connecting instances, sharing memory, and so forth). A task may specify synchronous or asynchronous execution. Shared memory buffers may connect microservices instances and may also be used for various platform operations such as remote invocation (e.g., over Ethernet, RDMA, or similar). This may result in the creation of a service flow.

A unified mechanism for addressing services may include a local software instance, local hardware implementation, or remote implementation of any type. The messaging service may take care of service path set up, including configuration of intermediate services for cross domain or cross server connections. The application may use any implemented method for communication with the messaging service, such as a URI, PCIe, library call, or similar. The application may also support sending of messages to the instances of microservices.

The message service flow supports various features:

An input queue may be implemented in a hardware friendly way with shared memory buffers.

Input queue redirection may be used to defer or delegate processing if the current instance is unable to accept processing for any reason, thus enabling "hot potato" load-balancing.

Service implementation, which may be software or hardware.

Optional hardware assists, which provide a platform pseudo-instruction, implemented as microcode, which may perform message forwarding. This may use internal tables for state, and may also perform load-balancing, argument validation, and so forth.

This allows the service stack to delegate to the platform or cloud services many well-formulated operations and responsibilities. Thus, infrastructure specialization and participation can occur independently and collaterally with evolution and optimization of tasks. Concerns such as whether switching is virtual or not, or how it will affect scaling or latency can be removed to lower levels where they are best matched to a dynamic environment. A microservice may thus know where to forward a message along a specific path; for example, the message forwarding function may implement a memory channel (instance on the same server), or use remote invocation through RDMA, or a fabric library over Intel® OmniPath™.

Services may have both software and hardware implementation, or a combination of both.

Hardware-based load balancing can facilitate the use of hardware implementations of services.

A pipe overflow notification mechanism may be used when there is a bottleneck along the service path.

Notification of new messages may be provided to the next service through lightweight semaphores, particularly when the recipient is on the same host, or via interrupts. In another example, the receiving service can poll input queues.

For application requests, the application prepares a message to be sent, including four parts:

A path ID provided by the messaging service.

Content.

Optional token ID (used for completion notification).

An optional prolog or epilog.

The path ID defines a logical path the message should follow, and implicitly encodes the entire flow, thus allowing messages to be sent without awaiting completion of processing of previous messages. The messaging service may provide a status with a token ID if requested by the application to track completion of requests.

Prologs and epilogs may be used to support polymorphic and pipelined messaging flows. prologs adapt processing of a message at a target so that customization is pushed closer to where data will be handled, and epilogs specify continuations and forwarding of data, results, events, or statuses. This may not necessarily be only to the invoker, but potentially to other entities as well. This broadens the concept of active messages to active flows.

Figure 10:
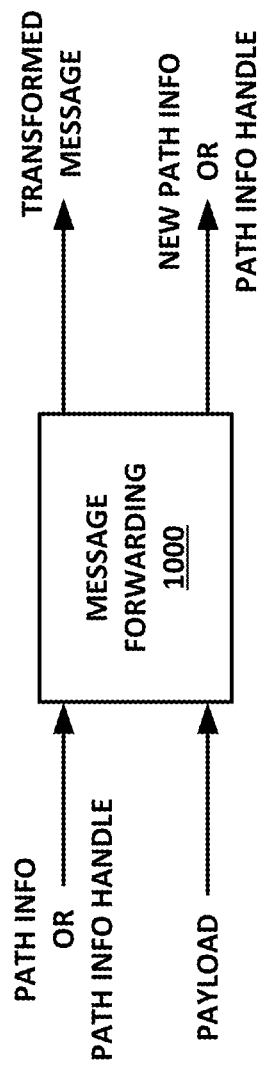
FIG. 10 is a block diagram illustrating message forwarding, according to one or more examples of the present specification

FIG. 10 is a block diagram illustrating message forwarding according to one or more examples of the present specification. In this case, a message forwarding block receives inputs and outputs as illustrated.

Internally, a message forwarder may be implemented as a redirection table that includes, but is not limited to, the following types of service instance entry points:

To a NIC or remote address, such as a remote URI.

To a PCIe BDF.

To software via exception or poll mode.

Via fabric.

To a memory or memory-mapped I/O (MMIO).

In the case of two applications communicating, instead of application A sending data to a service B, which may have both software and/or hardware implementations, application A sends a message to a message forwarding (MF) function 1000.

Inputs to MF function 1000 may include path information or a path information handle, as well as the payload to be forwarded.

MF function 1000 may transform the message as needed, to make it appropriate for the next hop. This may include encapsulation, decapsulation, or otherwise transforming the message. Message forwarder 1000 then sends the transformed message along with new path information or a path information handle.

In various embodiments, message forwarding function 1000 may take a direct or indirect part in transferring the message. In direct usage, MF 1000 receives a message from the application and forwards it to an appropriate service instance. In the indirect case, MF 1000 is a configuration, and requests to service endpoints go directly to the specified instance, assuming the instance supports direct invocation.

MF 1000 may provide activation and address/access intermediation. In other words, the MF 1000 may act as an information activation intermediary. For example, MF 1000 may send or forward a token to the destination service function. The destination may use that token to retrieve data from MF 1000. The service function may use that token to poll MF 1000 and know whether or not the source application is ready to deliver. This is different from, for example, the target service instance receiving data from the application and then contacting MF 1000. In other words, destinations may become active objects that do something, and higher-level code may act as a composer of these lower-level actions, setting them in motion and then getting out of the way.

A forwarding device implementing MF 1000 may implement addressing that does not need to be mapped to nodes and ports. Addresses instead may map to nameable entries and entity functions. An entity may be hardware, software, firmware, or any combination thereof, that has a receiver that a fabric interface may trigger. The result at the receiving endpoint is similar to invocation of a function:

If the triggered entity is software, the function invocation is a lambda or RPC.

If the triggered entity is a smart disk, the function invocation may be a disk operation.

If the triggered entity is a hardware accelerator, the function invocation may be an NQ operation.

If the target is an FPGA, then there may be an opaque handshake that orchestrates and links to the FPGA.

The foregoing are provided by way of nonlimiting example, and many other configurations are possible. The net result is that activities become decoupled and pipelined.

In the case of flow and execution management, the content of a message can include both intermediate data for processing and a reference to the data. For example, application A may send an encrypted message to microservice F, and send a token T to A's counterpart application C. When C contacts F with token T, C automatically decrypts and gives C another token M. When C decides to, it opens the stream M and reads the clear data. Polling is an efficient means of communication between remote entities, and does not require alerts or requests to take control. Instead, the remote entity may retrieve tokens by polling. Other options include NICs, enqueue or dequeue data streams, or similar.

Message forwarding pushes the message into preallocated buffers for a specific stream or flows. A zero-copy approach may also be used if preallocated buffers are shared with the application. The MF then invokes execution of hardware or software implementations. Buffering and burst processing may also be configured to minimize overhead and improve utilization of resources while maintaining quality of service (QoS), or deadlines if requested by the application. In one example, ring buffers may be used as an implementation of connections between application, a message forwarder, and service implementations.

Polymorphic behavior is also provided for. This blends the concept of active messaging in a polymorphic way, in which the active part of the active messaging is handled. This results in a blurring of the line between hardware, software, or accelerator, local or remote, polling or non-polling, so that the framework supports the notion that intelligence can be distributed and coordinated at high levels while data and event processing happens at low levels.

Message service chaining may also be a method for interprocess communication (IPC). This provides additional flexibility and decreasing cost of integration, and may use function as a service (FaaS) or microservices with bindings to a variety of IPC APIs and different languages.

Figure 11:
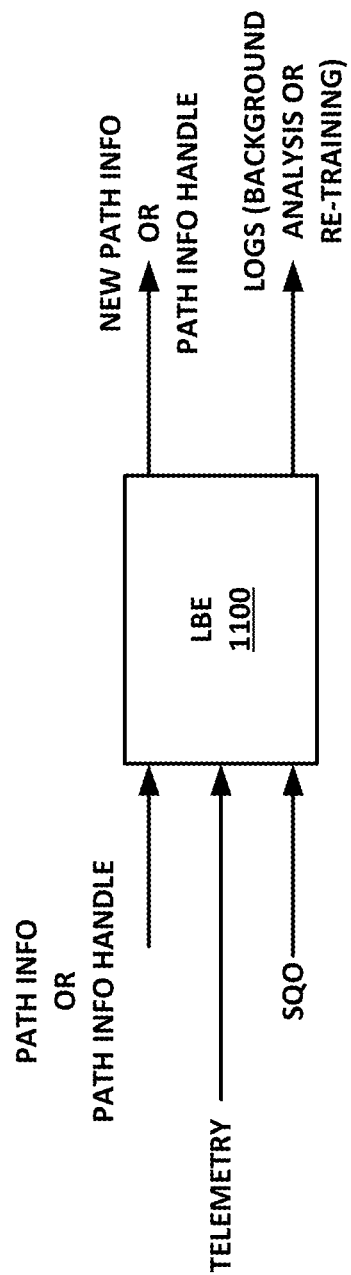
FIG. 11 is a block diagram of a load-balancing engine, according to one or more examples of the present specification.

FIG. 11 is a block diagram of a load-balancing engine (LBE 1100) according to one or more examples of the present specification. In various embodiments, message forwarding may support multiple load-balancing options. In this example, LBE 1100 receives a path info or path info handle for an incoming message, as well as telemetry from various instances of the target service function, and service quality objectives. This provides LBE 1100 with information to decide which instance of a microservice to route the request to, or whether to spawn a new instance of a microservice. LBE 1100 directs the incoming packet to an instance via new path info or path info handle, and may also keep logs such as for background analysis or retraining.

Load-balancing options include, by way of nonlimiting example:
  Arbitration for a free instance based on bus state.
  Round-robin load balancing.
  Weighted fair queuing.
  Load balancing by hot potato routing or by deadline-based (including maximum balances in time deadline). A forwarding table on the input may select alternative destinations when the current instance is overloaded.
  Prioritization (for example, preferring hardware instances with overflow to software instances).

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms 'memory' and 'storage,' as appropriate. A nontransitory storage medium herein is expressly intended to include any nontransitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a computing apparatus, comprising: a hardware computing platform; and logic to operate on the hardware computing platform, configured to: receive a microservice instance registration for a microservice accelerator, wherein the registration comprises a microservice that the microservice accelerator is configured to provide, and a microservice connection capability indicating an ability of the microservice instance to communicate directly with other instances of the same or a different microservice; and log the registration in a microservice registration database.

Example 2 includes the computing apparatus of example 1, wherein the logic is further configured to publish the microservice registration to a microservices driver.

Example 3 includes the computing apparatus of example 1, wherein the microservice registration database is an ontological database.

Example 4 includes the computing apparatus of example 1, wherein the connection capability comprises information configured to allocate the microservice accelerator to a service chain. This may include invoking a set of microservices in a sequence to perform a requested function.

Example 5 includes the computing apparatus of example 1, wherein the microservice registration database is further configured to include information for mapping a microservices application programming interface (API) call to a native invocation for the microservice accelerator, wherein the microservices API is a universal API for devices accessing the microservice accelerator. Native invocation may be optimally efficient based on implementation and location of the microservice and requestor of the service.

Example 6 includes the computing apparatus of any of examples 1-5, wherein the microservice registration database is further configured to include information for spawning a new instance of the microservice accelerator.

Example 7 includes the computing apparatus of example 6, wherein the information for spawning a new instance of the microservice accelerator comprises information for programming the new instance.

Example 8 includes the computing apparatus of example 7, wherein the information for programming the new instance comprises a gate configuration for a field-programmable gate array (FPGA). Other embodiments may include other firmware loaded on a hardware accelerator (like a GPU) to program it for a specific function.

Example 9 includes the computing apparatus of any of examples 1-5, wherein the logic is further configured to receive and store information about loading on existing instances of the microservice accelerator. Existing instances of the microservice accelerator can be programed to serve a new requestor as well, thus reducing resource overhead of spawning a new instance.

Example 10 includes one or more tangible, non-transitory computer-readable mediums having stored thereon executable instructions for providing a microservice discovery function (MDF) configured to instruct a device to: receive a microservice instance registration for a microservice accelerator, wherein the registration comprises a microservice that the microservice accelerator is configured to provide, and a microservice connection capability indicating an ability of the microservice instance to communicate directly with other instances of the same or a different microservice; and log the registration in a microservice registration database.

Example 11 includes the one or more tangible, non-transitory computer-readable mediums of example 10, wherein the logic is further configured to publish the microservice registration to a microservices driver.

Example 12 includes the one or more tangible, non-transitory computer-readable mediums of example 10, wherein the microservice registration database is an ontological database.

Example 13 includes the one or more tangible, non-transitory computer-readable mediums of example 10, wherein the connection capability comprises information configured to allocate the microservice accelerator to a service chain.

Example 14 includes the one or more tangible, non-transitory computer-readable mediums of example 10, wherein the microservice registration database is further configured to include information for mapping a microservices application programming interface (API) call to a native invocation for the microservice accelerator, wherein the microservices API is a universal API for devices accessing the microservice accelerator.

Example 15 includes the one or more tangible, non-transitory computer-readable mediums of any of examples 10-14, wherein the microservice registration database is further configured to include information for spawning a new instance of the microservice accelerator.

Example 16 includes the one or more tangible, non-transitory computer-readable mediums of example 15, wherein the information for spawning a new instance of the microservice accelerator comprises information for programming the new instance.

Example 17 includes the one or more tangible, non-transitory computer-readable mediums of example 16, wherein the information for programming the new instance comprises a gate configuration for a field-programmable gate array (FPGA).

Example 18 includes the one or more tangible, non-transitory computer-readable mediums of any of examples 10-14, wherein the logic is further configured to receive and store information about loading on existing instances of the microservice accelerator.

Example 19 includes a computer-implemented method of providing a microservice discovery function (MDF), comprising: receiving a microservice instance registration for a microservice accelerator, wherein the registration comprises a microservice that the microservice accelerator is configured to provide, and a microservice connection capability indicating an ability of the microservice instance to communicate directly with other instances of the same or a different microservice; and logging the registration in a microservice registration database.

Example 20 includes the method of example 19, further comprising publishing the microservice registration to a microservices driver.

Example 21 includes the method of example 19, wherein the microservice registration database is an ontological database.

Example 22 includes the method of example 19, wherein the connection capability comprises information configured to allocate the microservice accelerator to a service chain.

Example 23 includes the method of example 19, wherein the microservice registration database is further configured to include information for mapping a microservices application programming interface (API) call to a native invocation for the microservice accelerator, wherein the microservices API is a universal API for devices accessing the microservice accelerator.

Example 24 includes the method of any of examples 19-23, wherein the microservice registration database is further configured to include information for spawning a new instance of the microservice accelerator.

Example 25 includes the method of example 24, wherein the information for spawning a new instance of the microservice accelerator comprises information for programming the new instance.

Example 26 includes the method of example 25, wherein the information for programming the new instance comprises a gate configuration for a field-programmable gate array (FPGA).

Example 27 includes the method of any of examples 19-23, wherein the logic is further configured to receive and store information about loading on existing instances of the microservice accelerator.

Example 28 includes an apparatus comprising means for performing the method of any of examples 19-27.

Example 29 includes the apparatus of example 28, wherein the means for performing the method comprise a processor and a memory.

Example 30 includes the apparatus of example 29, wherein the memory comprises machine-readable instructions, that when executed cause the apparatus to perform the method of any of claims 19-27.

Example 31 includes the apparatus of any of examples 28-30, wherein the apparatus is a computing system.

Example 32 includes at least one tangible, non-transitory computer-readable medium comprising instructions that, when executed, implement a method or realize an apparatus as claimed in any of examples 19-31.

Example 33 includes a computing apparatus, comprising: a hardware computing platform; and logic implemented on the hardware computing platform to: receive an application programming interface (API) call to a microservice; discover an available microservice accelerator configured to provide the microservice; translate the API call to a native invocation for the microservice accelerator; and forward the native invocation to the microservice accelerator.

Example 34 includes the computing apparatus of example 33, wherein discovering the available microservice accelerator comprises querying a microservice discovery function (MDF).

Example 35 includes the computing apparatus of example 34, wherein the logic is configured to receive from the MDF a list of available microservice accelerators configured to provide the microservice.

Example 36 includes the computing apparatus of example 35, wherein the logic is configured to determine that no instance of a microservice accelerator with acceptable free bandwidth is available for the microservice, and to spawn a new instance of the microservice accelerator.

Example 37 includes the computing apparatus of example 36, wherein spawning the new instance comprises programming a new instance of the microservice accelerator.

Example 38 includes the computing apparatus of example 36, wherein spawning the new instance comprises programming a field programmable gate array (FPGA) to provide the new instance.

Example 39 includes the computing apparatus of any of examples 33-38, wherein the logic is configured to provision the microservice accelerator within a microservice chain.

Example 40 includes the computing apparatus of example 39, wherein the API call to the microservice is from a host device, and wherein the microservice chain is configured to operate independently of the host device.

Example 41 includes the computing apparatus of example 40, wherein the logic is configured to provide a message forwarder for the microservice chain in a hub configuration.

Example 42 includes the computing apparatus of example 40, wherein the logic is configured to daisy chain microservices in the microservice chain.

Example 43 includes one or more tangible, non-transitory computer-readable mediums having stored thereon instructions for providing a microservices driver, configured to: receive an application programming interface (API) call to a microservice; discover an available microservice accelerator configured to provide the microservice; translate the API call to a native invocation for the microservice accelerator; and forward the native invocation to the microservice accelerator.

Example 44 includes the one or more tangible, non-transitory computer-readable mediums of example 43, wherein discovering the available microservice accelerator comprises querying a microservice discovery function (MDF).

Example 45 includes the one or more tangible, non-transitory computer-readable mediums of example 44, wherein the logic is configured to receive from the MDF a list of available microservice accelerators configured to provide the microservice.

Example 46 includes the one or more tangible, non-transitory computer-readable mediums of example 45, wherein the logic is configured to determine that no instance of a microservice accelerator with acceptable free bandwidth is available for the microservice, and to spawn a new instance of the microservice accelerator.

Example 47 includes the one or more tangible, non-transitory computer-readable mediums of example 46, wherein spawning the new instance comprises programming a new instance of the microservice accelerator.

Example 48 includes the one or more tangible, non-transitory computer-readable mediums of example 46, wherein spawning the new instance comprises programming a field programmable gate array (FPGA) to provide the new instance.

Example 49 includes the one or more tangible, non-transitory computer-readable mediums of any of examples 43-48, wherein the logic is configured to provision the microservice accelerator within a microservice chain.

Example 50 includes the one or more tangible, non-transitory computer-readable mediums of example 49, wherein the API call to the microservice is from a host device, and wherein the microservice chain is configured to operate independently of the host device.

Example 51 includes the one or more tangible, non-transitory computer-readable mediums of example 50, wherein the logic is configured to provide a message forwarder for the microservice chain in a hub configuration.

Example 52 includes the one or more tangible, non-transitory computer-readable mediums of example 50, wherein the logic is configured to daisy chain microservices in the microservice chain.

Example 53 includes a computer-implemented method of providing a microservices driver, comprising: receiving an application programming interface (API) call to a microservice; discovering an available microservice accelerator configured to provide the microservice; translating the API call to a native invocation for the microservice accelerator; and forwarding the native invocation to the microservice accelerator.

Example 54 includes the method of example 53, wherein discovering the available microservice accelerator comprises querying a microservice discovery function (MDF).

Example 55 includes the method of example 54, further comprising receiving from the MDF a list of available microservice accelerators configured to provide the microservice.

Example 56 includes the method of example 55, further comprising determining that no instance of a microservice accelerator with acceptable free bandwidth is available for the microservice, and to spawn a new instance of the microservice accelerator.

Example 57 includes the method of example 56, wherein spawning the new instance comprises programming a new instance of the microservice accelerator.

Example 58 includes the method of example 56, wherein spawning the new instance comprises programming a field programmable gate array (FPGA) to provide the new instance.

Example 59 includes the method of any of examples 53-58, further comprising provisioning the microservice accelerator within a microservice chain.

Example 60 includes the method of example 59, wherein the API call to the microservice is from a host device, and wherein the microservice chain is configured to operate independently of the host device.

Example 61 includes the method of example 60, further comprising providing a message forwarder for the microservice chain in a hub configuration.

Example 62 includes the method of example 60, further comprising daisy chaining microservices in the microservice chain.

What is claimed is:

1. At least one non-transitory machine-readable storage medium storing instructions for being executed by at least one machine, the at least one machine being associated with server hardware, the server hardware being for use in providing services in association with at least one client, the instructions, when executed by the at least one machine, resulting in server hardware being configurable for performance of operations comprising:
    mapping application programming interface (API) calls to service request data, the API calls corresponding, at least in part, to the services providable by the server hardware, the service request data for being associated with at least certain of the services, the at least certain of the services being requestable by the at least one client;
    wherein:
        the API calls are to be used in association with invocation of the services;
        the services providable by the server hardware comprise at least one service;
        at least one service instance is to be used in providing the at least one service to the at least one client;
        the at least one service instance is associated with uniform resource locator information;
        the at least one service is to be provided in accordance with at least one tenant service agreement;
        the server hardware is configurable to dynamically allocate service chain resources, tenant resources, and accelerator resources in association with the providing of the at least one service;
        the service chain resources that are to be involved in dynamic allocation are to implement at least one function chain that is to be carried out by at least one ordered set of multiple of virtual machine instances and/or container instances; and
        the tenant resources that are to be involved in the dynamic allocation are to be provided in accordance with the at least one tenant service agreement.

2. The at least one non-transitory machine-readable storage medium of claim 1, wherein:
    the operations also comprise:
        registering the at least one service instance for use with at least one database, the at least one database being for use in association with service discovery.

3. The at least one non-transitory machine-readable storage medium of claim 1, wherein:
    the services are implemented, at least in part, using a plurality of service instances; and
    the plurality of service instances are configurable to comprise the virtual machine instances and/or the container instances.

4. The at least one non-transitory machine-readable storage medium of claim 3, wherein:
    the virtual machine instances and/or the container instances are configurable to comprise the accelerator resources, central processing unit (CPU), and/or memory resources; and the at least one service is configurable to be implemented using the at least one function chain.

5. The at least one non-transitory machine-readable storage medium of claim 4, wherein:
the at least one function chain defines at least one ordered set of service-related functions; and
the at least one function chain comprises a pipeline of functions.

6. The at least one non-transitory machine-readable storage medium of claim 2, wherein:
the providing of the services is associated with the uniform resource locator information.

7. The at least one non-transitory machine-readable storage medium of claim 6, wherein:
the server hardware is configurable to dynamically allocate instance resources in association with the providing of the at least one service; and
at least one cloud service provider comprises the server hardware.

8. Server hardware for use in providing services in association with at least one client, the server hardware comprising:
mapping hardware configurable to map application programming interface (API) calls to service request data, the API calls corresponding, at least in part, to the services providable by the server hardware, the service request data for being associated with at least certain of the services, the at least certain of the services being requestable by the at least one client;
wherein:
the API calls are to be used in association with invocation of the services;
the services providable by the server hardware comprise at least one service;
at least one service instance is to be used in providing the at least one service to the at least one client;
the at least one service instance is associated with uniform resource locator information;
the at least one service is to be provided in accordance with at least one tenant service agreement;
the server hardware is configurable to dynamically allocate service chain resources, tenant resources, and accelerator resources in association with the providing of the at least one service;
the service chain resources that are to be involved in dynamic allocation are to implement at least one function chain that is to be carried out by at least one ordered set of multiple of virtual machine instances and/or container instances; and
the tenant resources that are to be involved in the dynamic allocation are to be provided in accordance with the at least one tenant service agreement.

9. The server hardware of claim 8, wherein:
the server hardware also comprises:
registration hardware configurable to register the at least one service instance for use with at least one database, the at least one database being for use in association with service discovery.

10. The server hardware of claim 8, wherein:
the services are implemented, at least in part, using a plurality of service instances; and
the plurality of service instances are configurable to comprise the virtual machine instances and/or the container instances.

11. The server hardware of claim 10, wherein:
the virtual machine instances and/or the container instances are configurable to comprise the accelerator resources, central processing unit (CPU), and/or memory resources; and
the at least one service is configurable to be implemented using the at least one function chain.

12. The server hardware of claim 11, wherein:
the at least one function chain defines at least one ordered set of service-related functions; and
the at least one function chain comprises a pipeline of functions.

13. The server hardware of claim 9, wherein:
the providing of the services is associated with the uniform resource locator information.

14. The server hardware of claim 13, wherein:
the server hardware is configurable to dynamically allocate instance resources in association with the providing of the at least one service; and
at least one cloud service provider comprises the server hardware.

15. A method implemented, at least in part, using server hardware, the server hardware being for use in providing services in association with at least one client, the method comprising:
mapping application programming interface (API) calls to service request data, the API calls corresponding, at least in part, to the services providable by the server hardware, the service request data for being associated with at least certain of the services, the at least certain of the services being requestable by the at least one client;
wherein:
the API calls are to be used in association with invocation of the services;
the services providable by the server hardware comprise at least one service;
at least one service instance is to be used in providing the at least one service to the at least one client;
the at least one service instance is associated with uniform resource locator information;
the at least one service is to be provided in accordance with at least one tenant service agreement;
the server hardware is configurable to dynamically allocate service chain resources, tenant resources, and accelerator resources in association with the providing of the at least one service;
the service chain resources that are to be involved in dynamic allocation are to implement at least one function chain that is to be carried out by at least one ordered set of multiple of virtual machine instances and/or container instances; and
the tenant resources that are to be involved in the dynamic allocation are to be provided in accordance with the at least one tenant service agreement.

16. The method of claim 15, wherein:
the method also comprises:
registering the at least one service instance for use with at least one database, the at least one database being for use in association with service discovery.

17. The method of claim 15, wherein:
the services are implemented, at least in part, using a plurality of service instances; and
the plurality of service instances are configurable to comprise the virtual machine instances and/or the container instances.

18. The method of claim 17, wherein:
the virtual machine instances and/or the container instances are configurable to comprise the accelerator resources, central processing unit (CPU), and/or memory resources; and
the at least one service is configurable to be implemented using the at least one function chain.

19. The method of claim 18, wherein:
the at least one function chain defines at least one ordered set of service-related functions; and
the at least one function chain comprises a pipeline of functions.

20. The method of claim 16, wherein:
the providing of the services is associated with the uniform resource locator information.

21. The method of claim 20, wherein:
the server hardware is configurable to dynamically allocate instance resources in association with the providing of the at least one service; and
at least one cloud service provider comprises the server hardware.

\* \* \* \* \*